US006536966B1

(12) United States Patent
Butler

(10) Patent No.: US 6,536,966 B1
(45) Date of Patent: Mar. 25, 2003

(54) EXPANDABLE KEYBOARD FOR SMALL COMPUTERS AND THE LIKE

(76) Inventor: Robert Brown Butler, 20 Hazel Hill Rd., Mahopac, NY (US) 10541

( * ) Notice: Subject to any disclaimer, the term of this patent is extended or adjusted under 35 U.S.C. 154(b) by 108 days.

(21) Appl. No.: 09/624,235

(22) Filed: Jul. 24, 2000

Related U.S. Application Data

(63) Continuation-in-part of application No. 09/040,550, filed on Mar. 18, 1998, now Pat. No. 5,938,353.

(51) Int. Cl.⁷ .................................................. B41J 5/28
(52) U.S. Cl. ........................ 400/492; 400/472; 400/489
(58) Field of Search ............................... 400/492, 472, 400/489; 341/21

(56) References Cited

U.S. PATENT DOCUMENTS

| | | |
|---|---|---|
| 3,940,758 A | 2/1976 | Mangolin |
| 3,964,594 A | 6/1976 | Gabbrielli |
| 4,363,942 A | 12/1982 | Deeg ............................ 400/495 |
| 4,597,681 A | 7/1986 | Hodges |
| 4,739,541 A | 4/1988 | Pitts |
| 5,073,050 A | * 12/1991 | Andrews ....................... 400/82 |
| 5,141,343 A | 8/1992 | Roylance |
| 5,163,765 A | 11/1992 | Levy |
| 5,187,644 A | 2/1993 | Cuissan |
| 5,212,473 A | 5/1993 | Louis |
| 5,220,521 A | 6/1993 | Kikinis |
| 5,267,127 A | 11/1993 | Pollitt |
| 5,342,005 A | * 8/1994 | Szmanda et al. ............ 248/118 |
| 5,372,442 A | 12/1994 | Wang ............................ 400/495 |
| 5,388,921 A | 2/1995 | Chung |
| 5,439,304 A | 8/1995 | Phillips |
| 5,457,453 A | 10/1995 | Chin |
| 5,494,363 A | 2/1996 | Hoohgesang |
| 5,502,460 A | 3/1996 | Bowen |
| 5,519,569 A | 5/1996 | Sellers |
| 5,531,529 A | 7/1996 | Nusser ......................... 400/682 |
| 5,532,804 A | 7/1996 | Sellers |
| 5,539,615 A | 7/1996 | Sellers ......................... 400/682 |
| 5,543,787 A | 8/1996 | Kanidys |
| 5,575,576 A | 11/1996 | Rogsden, Jr. ................. 400/88 |
| 5,587,875 A | 12/1996 | Sellers ......................... 400/682 |
| 5,590,020 A | 12/1996 | Sellers ......................... 400/682 |
| 5,595,449 A | 1/1997 | Vitkin |
| 5,602,715 A | 2/1997 | Lempicki .................... 400/682 |
| 5,615,081 A | 3/1997 | Ma ............................. 400/682 |
| 5,619,394 A | 4/1997 | Oros ........................... 400/682 |
| 5,625,532 A | 4/1997 | Sellers ......................... 400/682 |
| 5,635,928 A | 6/1997 | Tagaki |
| 5,646,817 A | 7/1997 | Manser ........................ 400/682 |
| 5,648,771 A | 7/1997 | Halgren |
| 5,654,872 A | 8/1997 | Sellers ......................... 400/682 |
| 5,659,307 A | 8/1997 | Karidys |
| 5,666,112 A | 9/1997 | Crowley |
| 5,667,826 A | 9/1997 | Lasater ........................ 400/490 |
| 5,687,058 A | 11/1997 | Roylance |
| 5,717,431 A | 2/1998 | Chia-Ying |
| 5,742,241 A | 4/1998 | Crowley |
| 5,870,034 A | 2/1999 | Wood |
| 5,880,712 A | 3/1999 | Goldman |

OTHER PUBLICATIONS

Keytronic Flex Pro Advertisement, pp. 1–2, 1993.*
Weird Keyboards:Rx for the Hands?, p. 64, PC World, May 1993.*
Comfort Keyboard System Advertisement, pp. 1–2, 1993.*

* cited by examiner

*Primary Examiner*—John S. Hilten
*Assistant Examiner*—Charles H. Nocan, Jr.

(57) ABSTRACT

An alphanumeric keyboard whose keys are mounted on a scissor-linkage and have interlocking sides that allow said keyboard to contract to a width that is considerably less than the width of a standard desktop computer keyboard and which is operable when open or closed.

16 Claims, 19 Drawing Sheets

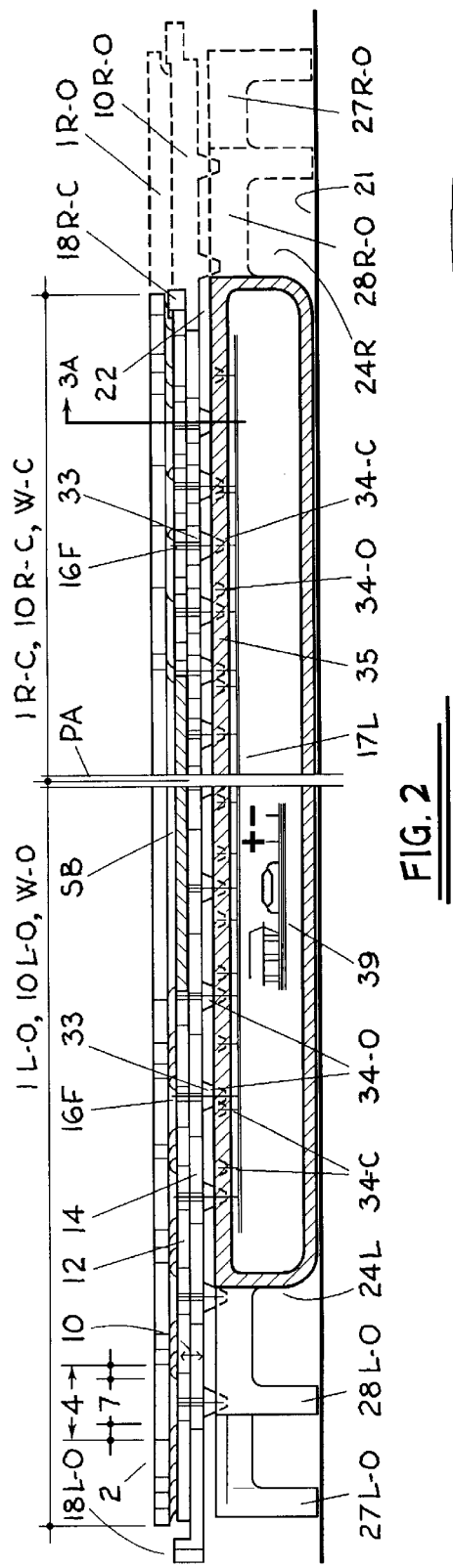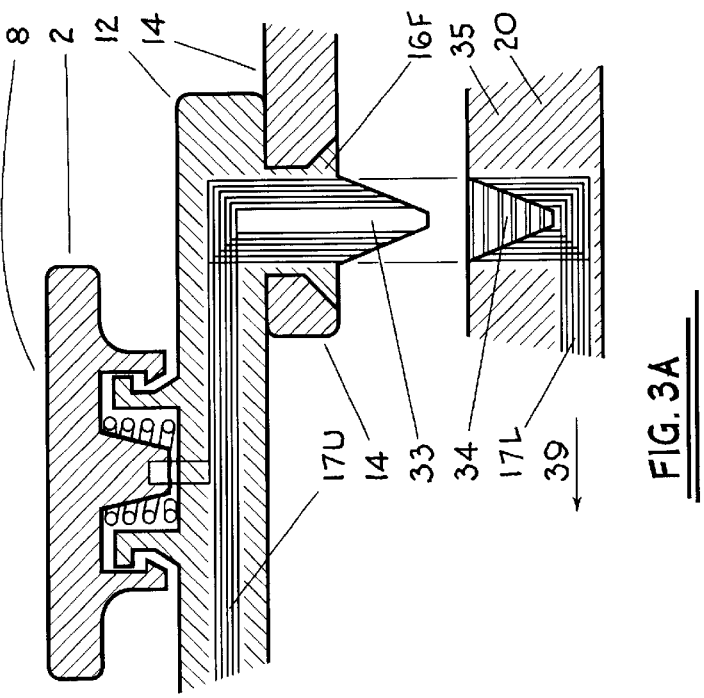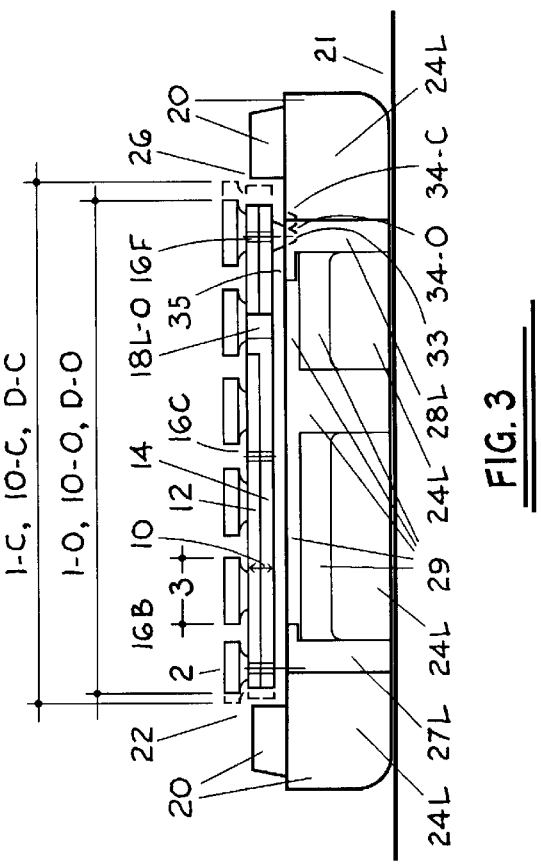

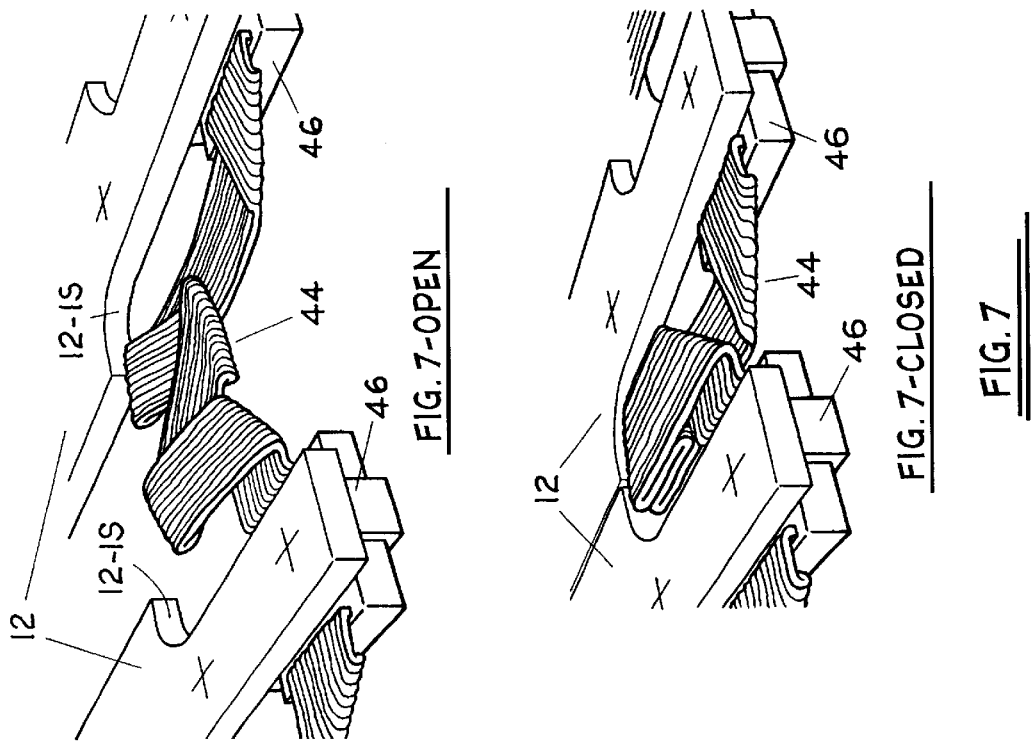
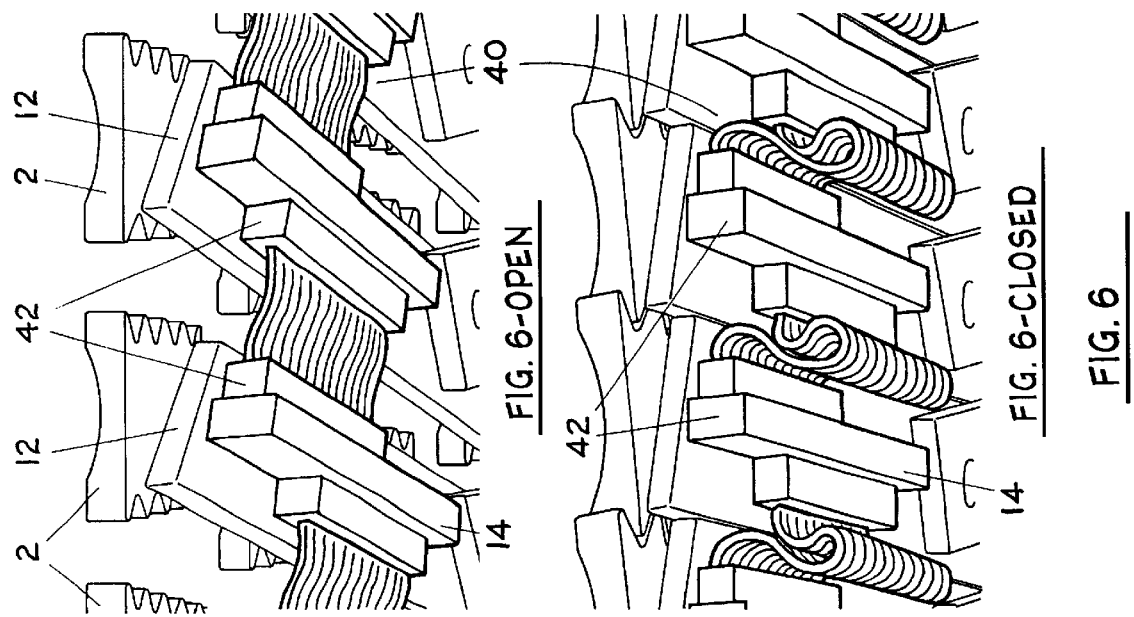

FIG. 8-OPEN

FIG. 8-CLOSED

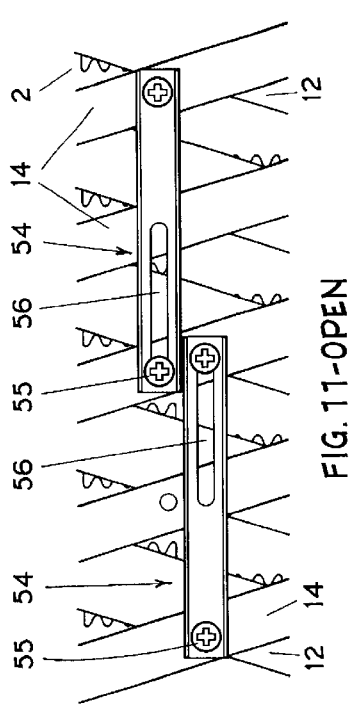
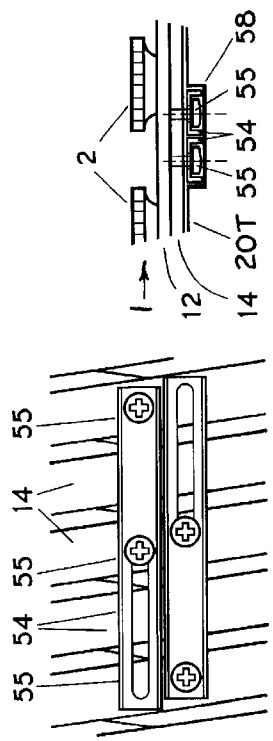
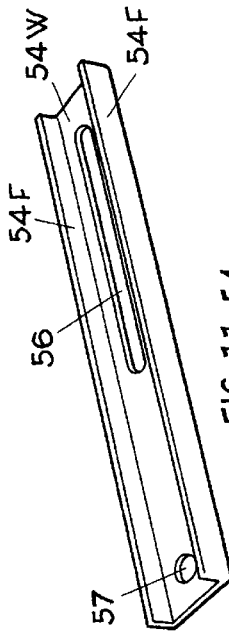
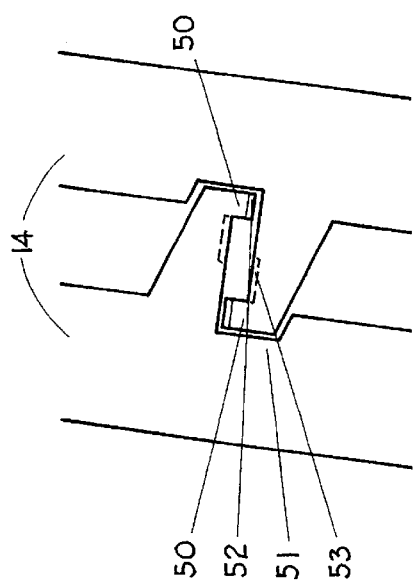
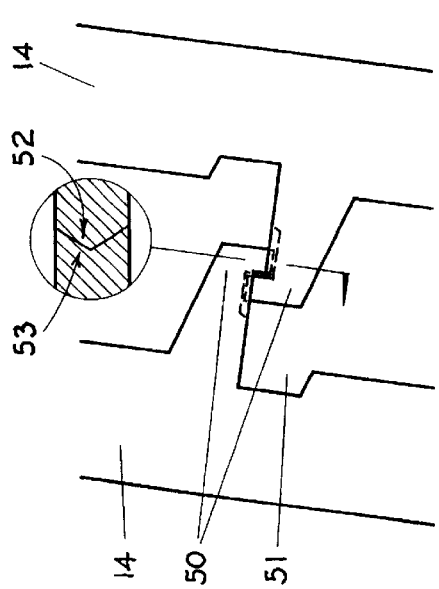

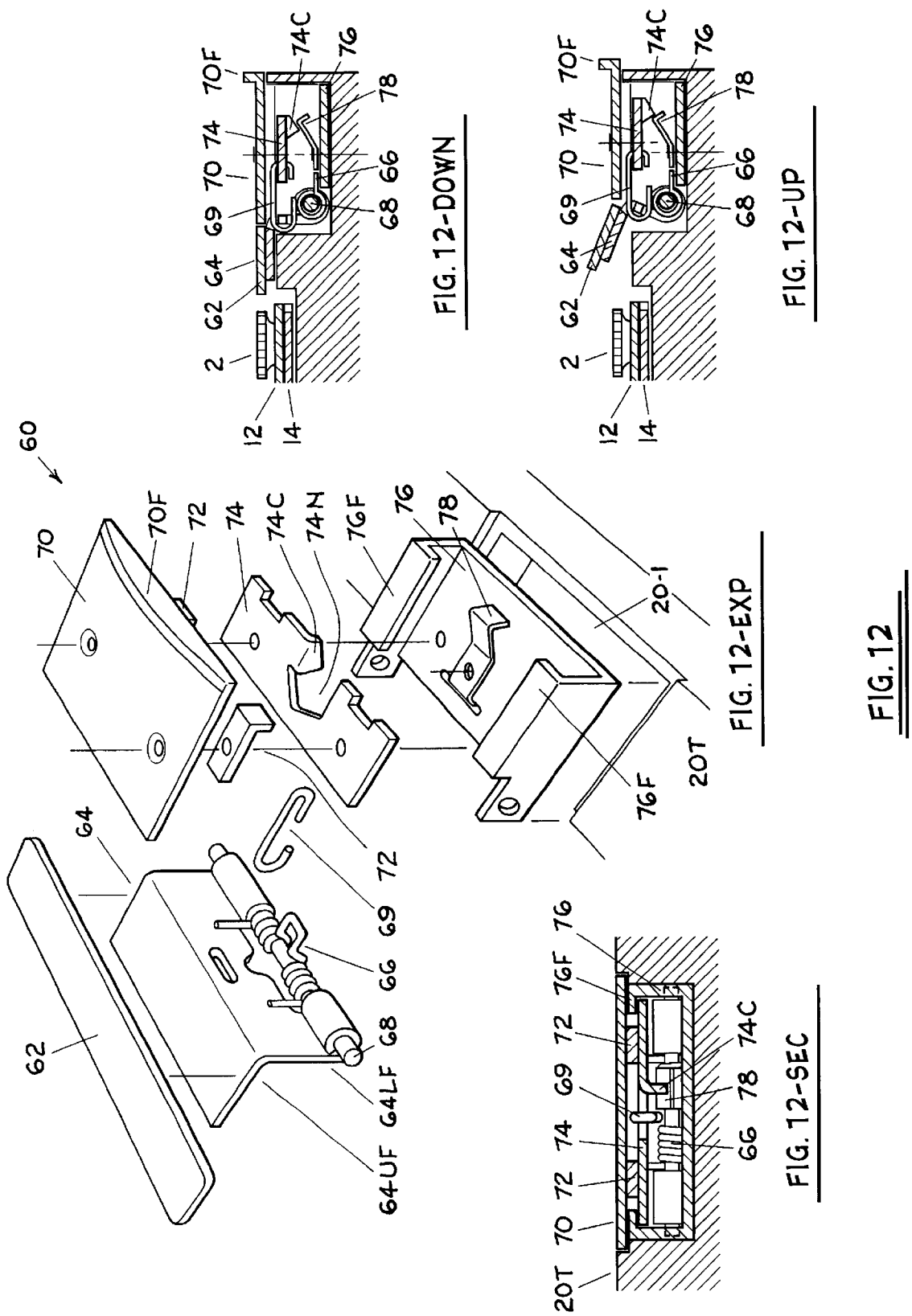

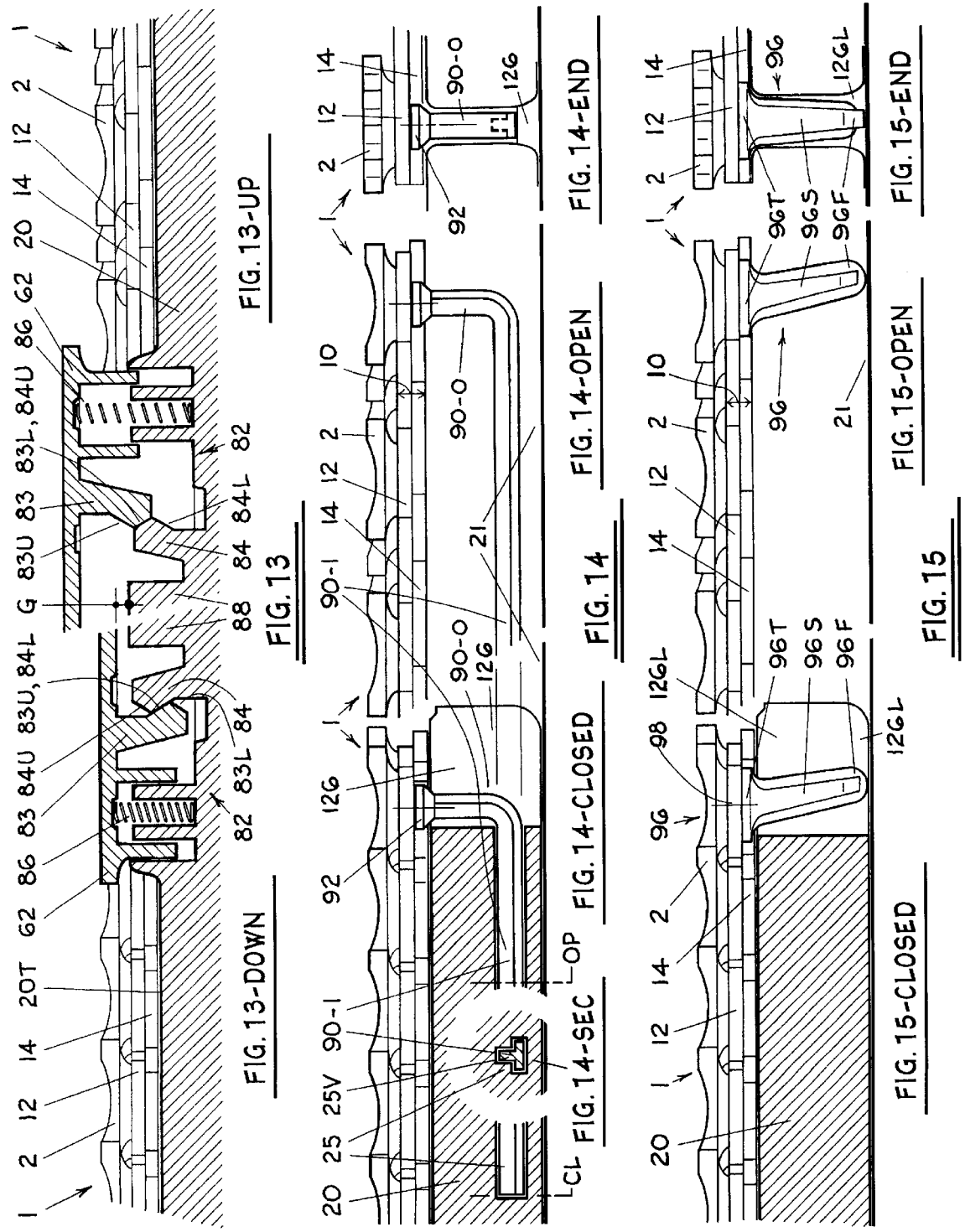

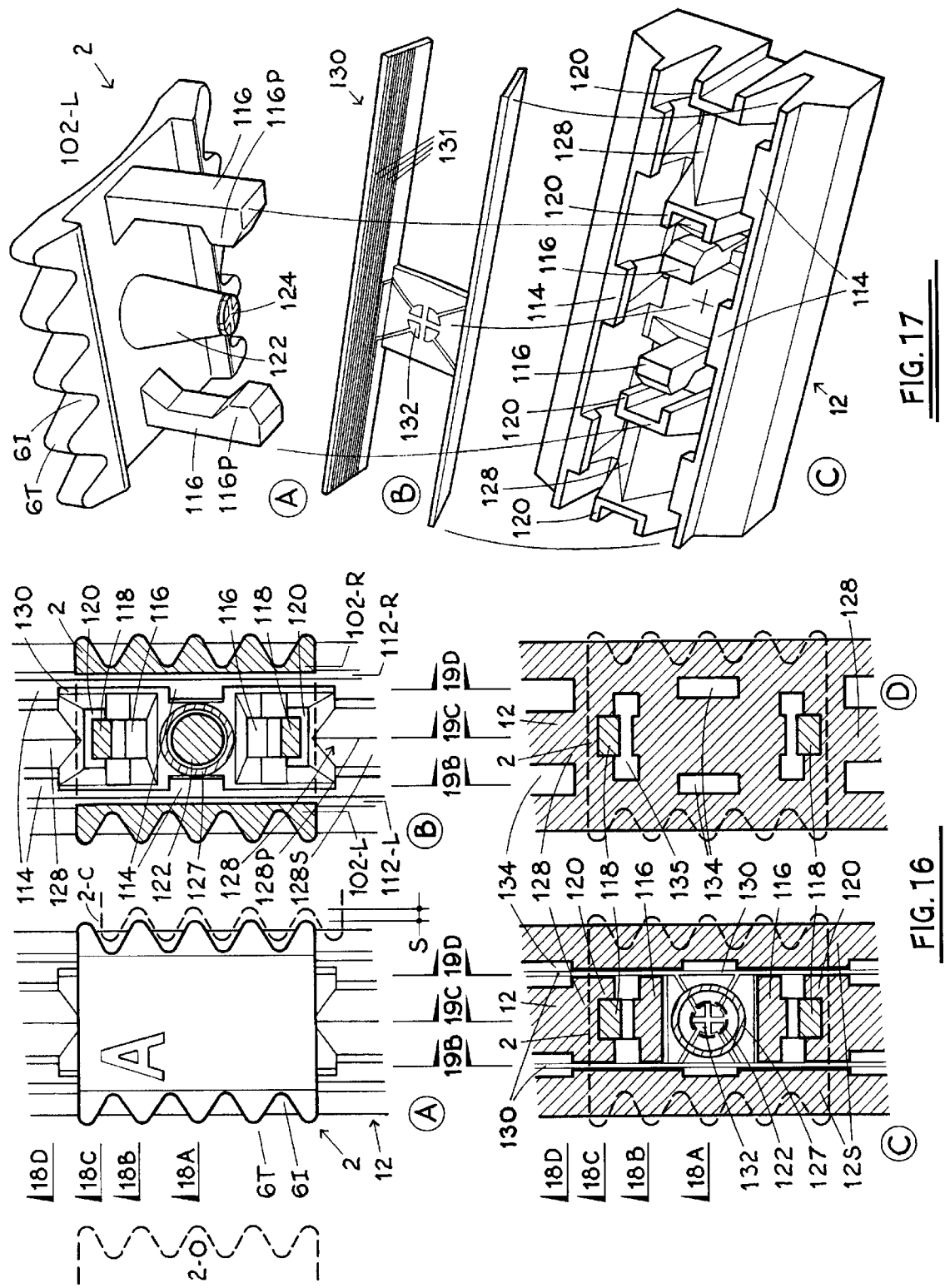

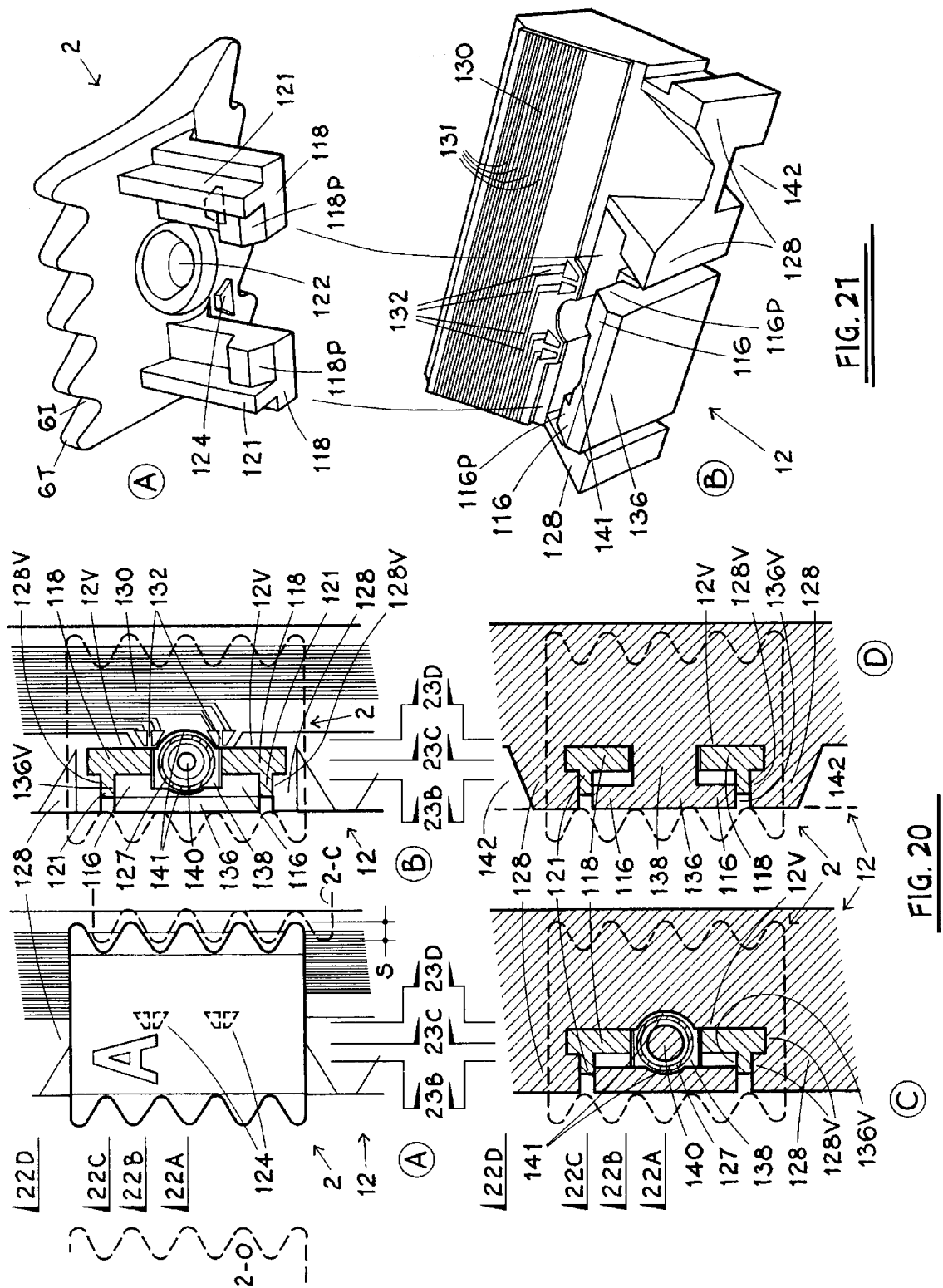

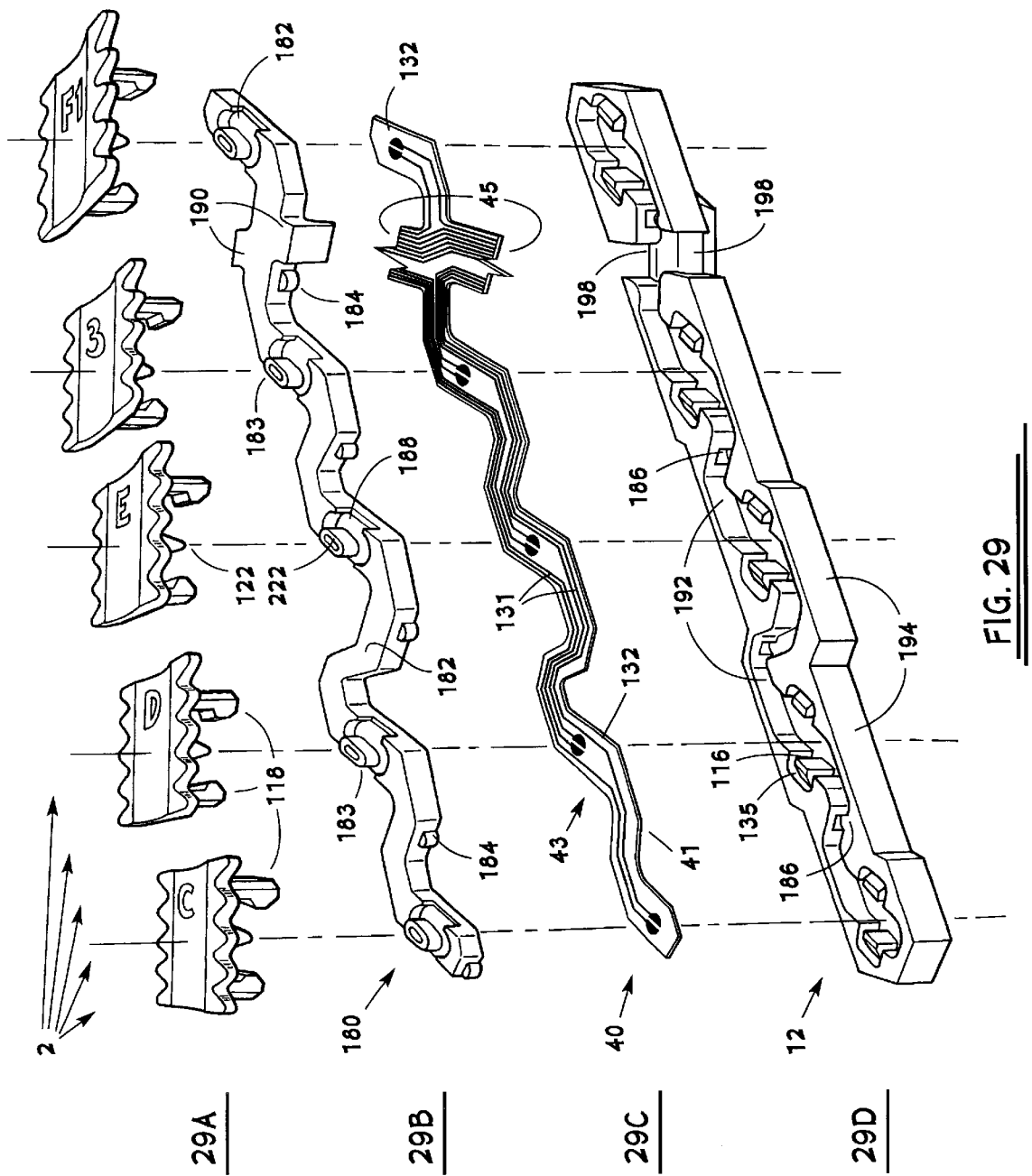

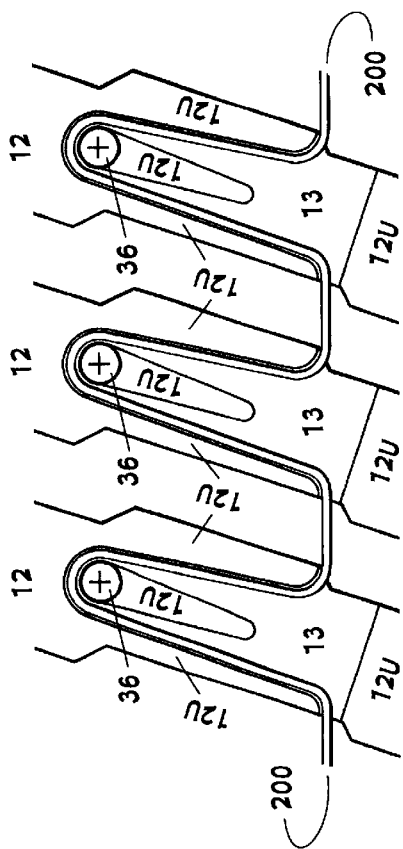
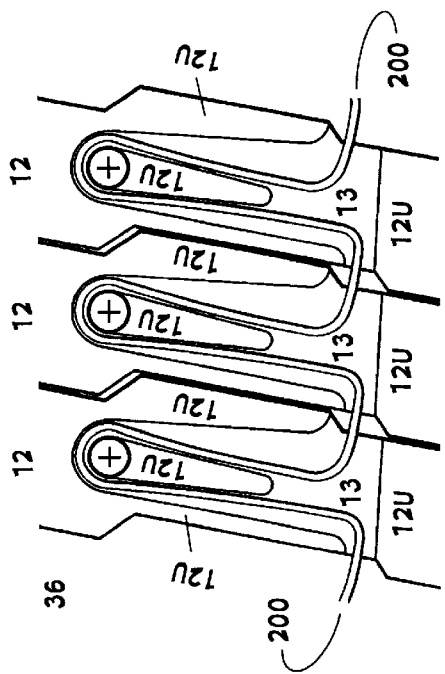
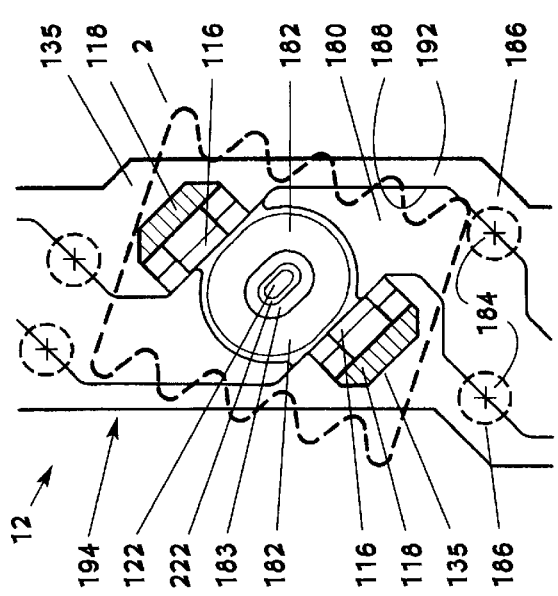
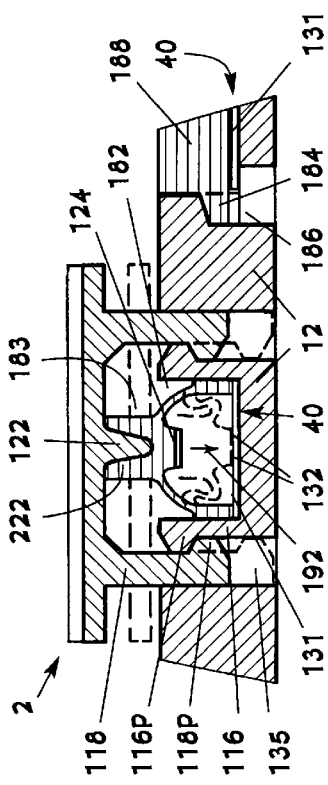
FIG. 32-OPEN
FIG. 32-CLOSED
FIG. 32
FIG. 30
FIG. 31

EXPANDABLE KEYBOARD FOR SMALL COMPUTERS AND THE LIKE

This is a Third Continuation In part (C.I.P. 3) of a Patent whose original filing date was Mar. 18, 1998, whose Ser. No. is 09/040,550, is now U.S. Pat. No. 5,938,353 whose First Continuation In Part (C.I.P. 1) was submitted to the PTO on Jun. 1, 1999, and whose Second Continuation In Part (C.I.P. 2) was submitted to the PTO on Aug. 4, 1999.

This is a Third Continuation In Part (C,I,P, 3) of a present Patent Pending whose original filing date was Mar. 18, 1998, whose Ser. No. is 09/040,550, whose First Continuation In Part (C.I.P. No. 1) was submitted to the PTO on Jun. 2, 1999, and whose Second Continuation In Part (C.I.P. No. 1) was submitted to the PTO on Aug. 4, 1999.

FIELD OF THE INVENTION

This invention relates in general to the use of small computers and other lightweight or mobile electronic devices that receive data input by alphanumeric or operational means.

BACKGROUND OF THE INVENTION AND PRIOR ART

Throughout the 1990s the computers that millions of people now use worldwide have improved at an amazingly rapid rate, to the point that the power and mobility these devices now have is truly breathtaking. In particular, the amount of work they can do has greatly increased while at the same time their size has greatly decreased, the latter to the point that today a capacious and multifunctional computer can be made that is no bigger than a common videocassette. But such devices have one major limitation: their keyboard keys are presently so small and close together that it is impossible to enter data into them at typical secretarial speed for any length of time. Indeed, in February 1998 one research manager for a major computer maker (Celeste Baranaski of Hewlett-Packard) said: "Unless some breakthrough is made in keyboard technology, many of these smaller travel keyboards just won't work." And in that same month a journalist (David MacNeill of *Pen Computing Magazine*) Said of present palmtop computers that their "Inappropriate input methods, such as tiny QWERTY keyboards, hobble us in our attempt to enter our information into a device, wasting our time, and even causing physical pain." Indeed, even a slight reduction in a keyboard's width may significantly reduce a typist's speed—as then the keys are arranged differently than the spacing at which one may be accustomed to typing.

However, a few inventors have long been aware of this potential deficit of typewriters, computers, laptops, palmtops, calculators, and other alphanumeric/operational input devices that are designed with versatility and mobility in mind. For example, in 1974 George Margolin in his U.S. Pat. No. 3,940,758 described an EXPANDABLE KEYBOARD FOR ELECTRONIC POCKET CALCULATORS AND THE LIKE, in which "a keyboard of familiar layout for a full-size desk top data terminal is organized in three modular portions:" which when closed its three modular portions are arranged in a stacked position as shown in FIG. 7 of Margolin's Patent. But it is obvious that Margolin's invention, while reducing the surface or 'footprint' area occupied by a standard desktop keyboard by about two-thirds, does so at a sacrifice of triply increasing the keyboard's depth, so that such a device could hardly be carried like a videocassette in one's pocket or purse. Then in 1991 Adrian Crissan in his U.S. Pat. No. 5,187,644 described a COMPACT PORTABLE COMPUTER HAVING AN EXPANDABLE FULL SIZE KEYBOARD WITH EXTENDIBLE SUPPORTS, in which the outer quarters of his keyboard comprise "a pair of fold-out flaps containing a portion of the keys" which can be rotated upward and inward so that when closed said outer quarters lay flat upon the middle half of the keyboard. But this arrangement also considerably increases the invention's depth by the thickness of its folded-over portions, as is obvious from examination of FIG. 1 of Crissan's Patent. A further deficit of Margolin's and Crissan's inventions is that when their keyboards' outer portions are folded onto their central portions, all the keys are concealed so they cannot be used when their keyboards are thusly closed. A number of other patented keyboards, especially U.S. Pat. No. 5,141,343 to Roylance for a COMPRESSIBLE/EXPANDABLE KEYBOARD WITH ADJUSTABLE KEY SPACING, U.S. Pat. No. 5,659,307 to Karidis et al for a KEYBOARD WITH BIASED MOVABLE KEYBOARD SECTIONS, U.S. Pat. No. 5,543,787 to Karidis et al for a KEYBOARD WITH TRANSLATING SECTIONS, and U.S. Pat. No. 5,870,034 to Wood for a COMPACT COMPUTING DEVICE WITH COMPRESSIBLE KEYBOARD (see also Classes 400/88 and 400/682) have keys arranged that close upward, downward, or sideward in various ways, but none of them simultaneously allow the parent system to (a) reduce its width by as much as 40 percent without compromising any other dimensional aspect and (b) operate in both open and closed positions as does the Disclosed Invention.

SUMMARY OF THE INVENTION

If one looks at a standard keyboard, one will notice a significant amount of space between the sides of any pair of adjacent keys. In a standard keyboard with 'Chiclet' style keys and a standard 19 mm pitch (center-to-center dimension between two adjacent keys), these intervening voids typically include about one-third the center-to-center distance between adjacent keys. Now if these voids could somehow be maintained when the keys were in standard or 'open' position, yet eliminated when the keys were in contracted or 'closed' position, a keyboard's total width could easily be reduced by about one-third when closed. Then if the sides of each key were given indented profiles that would allow each pair of adjacent keys to interlock when they closed, the distance between their centers could be reduced even more, until a 28–29 cm wide standard keyboard could easily be fitted into the 18–19 cm length of a common videocassette—at no increase of depth. This is what the Disclosed Invention does. Specifically, its keys are mounted on a laterally flexible assembly made of a multiple-X network of supporting busbars and interconnecting braces, in which the busbars conduct electronic data from any activated key mounted on their tops and the braces interconnect the busbars and stabilize them and the keys above; then the sides of adjacent keys have indented profiles that enable all the keys to be drawn even closer together than could occur with normally straight-sided keys. The busbars may also have positional guides beneath their front ends that keep the keyboard from sliding or moving out of place whether it is open or closed, and these guides may have electrical contacts that conduct electronic data from the keys' micro-circuitry to the operational circuitry of the parent computer or other electronic system, also whether the keyboard is open or closed. The Disclosed Invention's total assembly of keyboard and laterally flexible assembly would also remain thin, so its depth alone will not seriously impact the depth of the parent system in which it is installed.

The utility of the Disclosed Invention is further enhanced by certain means of trigonometric trickery that seem to deceive the eye. For example, when the laterally flexible assembly's sides extend from closed to open position, its front-to-back or longitudinal dimension must necessarily decrease; but surprisingly, when its lateral dimension is increased from 17.7 to 27.8 cm—more than 57 percent—its front-to-back dimension decreases by only 9.36 to 9.13 cm—hardly 2 percent. Indeed, at the above dimensions (which were taken from a working model made by the inventor), the disclosed keyboard's surface area when in open position is actually 53 percent greater than when closed. Thus this keyboard, while greatly increasing the width of its keys when it is extended to open position, does not create rows of keys whose fronts and backs become too close together when they are open nor does it seriously affect the longitudinal dimension of its parent system when they are closed. Another trigonometric trick of the Disclosed Invention's laterally flexible assembly is that when it contracts, the keys mounted on it rotate slightly, which allows the keys' indented side edges to interlock in a manner that enables the keys to have the same side-to-side symmetry as those of normal keyboard keys—qualities that make the disclosed keyboard more interesting and attractive as well as easier to use.

Subsequent to this Patent's original filing date, the Inventor has made numerous improvements to the Disclosed Invention and incorporated them into this Continuation-In-Part (C.I.P. No. 1), as described below:

As originally filed, the Disclosed Invention includes a certain matrix of electrical conductors that underlies the keys and conducts electronic data through electrical contacts on their undersides of their busbars to the parent computer or other electronic system that the invention serves. However, this matrix of conductors has been improved as follows:

If one examines the matrix of microcircuitry that underlies the keys of a standard computer keyboard, one will find in addition to numerous horizontal and vertical circuits all sorts of diagonal and curving circuits, of which the latter are not adaptable to the arrangement of essentially parallel and equidistant busbars as described in the Disclosed Invention as originally filed. On the other hand, the wiring matrix that underlies a typical digital-dial telephone's four-by-three-row arrangement of 12 keys (10 numerals plus the # and * keys) is a simple arrangement of four horizontal and three vertical circuits. Now, considering that the keys of the Disclosed Invention are arranged in horizontally lateral rows (i.e. the A S D F G H J K L ; ' keys) and diagonally front-to-back columns (i.e. the busbars oriented as \\\\\\\\\\ of which the F3 3 E D C keys comprise one such column), a digital phone wiring matrix can be enlarged, laid nearly flat, and its top inclined slightly to the left so its horizontal and vertical wires align with the keyboard's rows and columns of keys. Then, since a number of these hair-sized conductors can easily be arranged as on computer circuitboards within the width of a busbar (especially if these bars are widened as described further below), the horizontal wires on each busbar may extend along the sides of the keys and converge at a collector locus near the back of the bar, from where a flexible multiple microconductor known as "ribbon cable" or "circuitry ribbon" can span the varying distance to a mating collector locus near the back of the adjacent busbar. Such flexible multiple microconductors are found in many of today's computers and their printers, two examples being the flexible flat cable that extends from a laptop computer's base through its hinged top to its LED display, and the ribbon cable that extends from an ink-jet printer's processor to its ink-cartridge assembly (these latter cables are so flexible and durable that much of their 14-inch length is bent almost 180° every second as the ink-cartridge assembly dashes back and forth across each page as the printer operates). Next, suppose the keyboard is divided into three parts: (1) the leftmost keys that lie to the left of the centermost bar, (2) the rightmost keys that lie to the right of the centermost bar, and (3) the centermost bar, or spine bar, which is the busbar that supports the keys F6 6 Y H N keys. Now, considering only the leftmost keys for the moment these keys have 6 horizontal rows and 6 near-vertical rows. Thus, adapting the digital phone wiring matrix described above, these keys can have 6 horizontal wires and 6 near-vertical wires underlying their rows and columns, then on each busbar each horizontal wire turns upward at the sides of each key and the vertical wires turn to the right at the bar's back in a manner that leads all the wires to a collector locus near the back of the bar; then from here the wires (plus possibly an incoming power and/or ground wire) extend via a flexible flat cable to a second collector locus on the busbar adjacent to the right, and in this manner a series of flat cables extends from busbar to busbar toward a collector locus near the back of the spine bar. Such a matrix comprises the microcircuitry for the leftmost keys of the keyboard, and a similar matrix of microcircuitry for the rightmost keys is for the most part a mirror image of that of the leftmost keys. Then all the leftmost and rightmost wires (plus the wire for the spine bar's keys) extend from the back of the spine bar to its front, where, since this bar's bottom moves very little as the keyboard opens and closes, a final flexible flat cable connects all the leftmost, rightmost, and spinebar wires to an XY decoder situated beneath the spacebar. Then from the XY decoder a pulse train of binary code from all the keys enters the parent system where this data is processed into the characters that appear on the system's display.

However, before proceeding on, an important exception to the above-described XY matrixing should be pointed out here. The number of circuits required for each key can be other than two: it can be one, or three, or theoretically any other number, because all that is necessary is for each key to have its own unique combination of circuits leading from it to the parent system's processor. Obviously one extreme would be for each key to have its own private circuit to the parent processor; but this of course would be a cumbersome ribbon for a keyboard of more than seventy keys to carry. The other extreme would be for each key to be lined up on a neat XY matrix, as then a minimum number of circuits could serve all the keys. But for reasons that are too complicated and irrelevant to describe here, some operational or functional keys usually need their own individual 'hot line' to the parliamentary processor, a circuit they share with no other key; so that in most embodiments of the Disclosed Invention the collective feeder ribbon that connects the whole keyboard to the parent processor will likely contain more than the theoretically minimum number of circuits.

The chief advantage of this microcircuitry matrix as described above is not only its improved nature but its articulation. Although the Disclosed Invention's Patent as originally filed described a means of conducting electronic data from the keyboard to the parent system, it did little more than describe this circuitry in one of its drawings as "a typical schematic of the microcircuitry" in part of one busbar and the parent system below. And prospective manufacturers of the Invention have evinced a desire to know not only that electronic data can be conducted from the keyboard to the parent system, but how, and their interest in the Disclosed Invention will remain nascent until they have this information. Thus this Continuation in Part includes a microcircuitry map of the keyboard and claims related thereto.

An important aspect of the above-described microcircuitry is the design of the flexible flat cables that conduct electronic data from busbar to busbar to the XY decoder beneath the spacebar whether the keyboard is open or closed. These conductors may have at least three equally functional embodiments: (1) A flexible flat cable or ribbon that extends from the back of one busbar to the back of the adjacent bar so that when the keyboard is open the ribbon extends rather flatly between the bars and when the keyboard is closed the ribbon droops pronouncedly between the bars. (2) A flexible flat ribbon folded into a roughly "W" shape whose ends are connected to indents in the adjacent sides of two busbars so that the ribbon remains generally in its plane of movement as the keyboard opens and closes. There are many possible variations of this type of conductor. In fact, ribbon 1 may also have one or more accordion-like folds that reduce the depth of its ride. (3) Conductance via wireless means. By locating on each busbar a small microchip with a drive circuit that activates an adjacent sender photodiode and locating on the adjacent busbar a mating microchip and receiver photodiode, a series of wireless sender/receivers can carry electronic data from busbar to busbar on to the XY decoder under the spacebar. The chief advantage of all three conductors is that they give prospective manufacturers more flexibility in assembling the Disclosed Invention according to their own design criteria and inclinations.

As originally filed, the Disclosed Invention's keyboard establishes its minimum width when closed by having the sides of its keys touch each other as they interlock. But if the keys touch, any depressed key might activate an adjacent one. However, if the width of each busbar is increased until it is, soy, 1 mm wider than the narrowest or indent-to-indent width of each key above, the busbars' abutting sides will maintain a corresponding 1 mm gap between the indents of adjacent keys when the keyboard is closed. The wider busbars can also hold a given number of microconductors more easily, they provide a wider anchor for the keys mounted thereon, and they can be made thinner while remaining just as strong which creates a thinner computer. Also, the laterally flexible assembly's braces can be made wider as described above instead of or in addition to the busbars.

As originally filed, the Disclosed Invention included guides on the underside of its laterally flexible assembly that positioned the keyboard and conducted electronic data between its keys and and the parent system when the keyboard was in open and closed position. Although subsequent improvements in the Disclosed Invention have indicated that the original positional guides/circuitry conductors may not be the optimal solution for these two different functions, recent analysis has indicated another function for such guides which this Disclosure has not yet addressed. This is a need for the keyboard to inform a user when it has reached its open and closed positions. This the keyboard could easily do by having a number of small guides on its underside that mate with a similar number of receptive surfaces on the parent system below to create an audio/tactile means that informs the user when the keyboard has reached its exact open or closed position, as then the user will not be left wondering whether or not the desired position has been attained.

As originally filed, the Disclosed Invention's keyboard has no means of limiting its maximum width when open, other than "the movable positional guides on the undersides of the busbars that serve to accurately locate the keys." But such guides do not solve a 'linkage-lag' problem revealed by the Invention's prototypes built subsequent to this Patent's original filing: when the closed keyboard is opened, the outer busbars tend to open even wider than their 19 mm spacings before the central bars begin to spread apart, even if the laterally flexible assembly is precisely made. But if integral hooks are placed on the sides of the laterally flexible assembly's braces as shown in FIG. 11 of the Drawings, the hooks will rotate slightly as the keyboard opens and interlock when the keys are 19 mm apart. Another way to achieve the same result is to locate a series of sliding slotted stops on the braces' undersides as shown in FIG. 12 of the Drawings. Such limiters not only eliminate the "linkage-lag" problem described above and establish the exact 19 mm key-to-key pitch that equates this keyboard's open position with standard desktop keyboards, they additively determine the width of the keyboard when it is open.

As originally filed, the Disclosed Invention has only two positions: open and closed. However, certain embodiments could have positional guides that articulate an intermediate setting between these two positions, for purposes of making the Invention more useful for children with small hands whose fingers might not easily reach a keyboard's normally-spaced keys. This feature could have significant ramifications in the field of elementary education.

As originally filed, the Disclosed Invention makes no mention of any up-and-down movement of the spacebar, other than implying that it moves up and down during its normal operation. However, in certain embodiments this elongate key may need to lift upward slightly to allow the keyboard to slide more freely as it opens and closes, and/or this key may need to push downward slightly and hold the keyboard secure while the latter is being used. Such lifting and clamping can be achieved by installing a spring mechanism with a small handle on top directly in front of the spacebar, so that when the handle is moved one way it forces the spacebar up and when it is moved the other way it forces the spacebar down. Another means of doing the same is for the spacebar to spring up slightly as the keyboard is opened or closed, then the bar is pushed back down before the keyboard is used.

As originally filed, the Disclosed Invention has four supports on the computer's sides which swing outward before the keyboard is opened so they can hold up the outermost keys that protrude beyond the computer's sides; then after the keyboard is closed, the supports swing back into the computer's sides. But a simpler way to provide the same support is to mount under the keyboard's outer corners four small legs that are mostly hidden in the computer's base when the keyboard is closed then slide out automatically as the keyboard is opened. But for such legs to work well, the parent system would have to rest on a planar surface. But this need can be eliminated by installing under the keyboard's corners outriggers that cantilever from the computer's base as the keyboard is opened. Then when fully open, the keyboard's outermost keys are supported in a way that enables a small computer to be placed on one's lap or any other irregular surface.

Subsequent to this Patent's First Continuation In Part (C.I.P. 1) which was submitted to the PTO on Jun. 2, 1999, the Inventor has made further improvements to the Disclosed Invention and incorporated them into this Second Continuation-In-Part (C.I.P. 2), as described below.

As originally filed in this Invention's Patent and subsequently filed in its C.I.P. 1, the Disclosed Invention includes a keyboard of alphanumeric and operational keys wherein each key is mounted on a busbar, of which a typical key-to-busbar construction is shown in the sectional view of FIG. 3A. However, this key-to-busbar construction has been improved as follows:

1. The tops of each key are dished from front to back, the outer edges of their interlocking sides are thinner and become gradually thicker toward the key's center, and the continuous edge beneath the key that engages a longitudinal guide projecting from the busbar below is replaced by two prongs projecting from the key's underside, wherein said prongs engage two similar prongs rising from the busbar in a manner which holds the key in place when it is poised in unactivated position and allows the key to be removed for purposes of cleaning and repair when an upward leverage is applied under one of its edges.

2. The tiny circular spring beneath each key is replaced by a flexible circular hollow grommet that collapses to a fraction of its height when pressure is applied to its top.

3. The circuitry that conducts electronic data from each activated key to the parent system and is imbedded in the busbars connection to the brace below (see FIG. 3A) is replaced by a paper-thin ribbon of slightly flexible plastic with the key's circuitry printed on its surface and is located separately from the busbar's connection to the brace below. Many such printed circuitry ribbons can be cheaply made and then cut, creased, and fitted into or onto the busbars as shown in FIGS. 16 to 23.

4. Each busbar is no longer a flat bar with a simple rectangular cross-section, but instead is quite thicker as described in two improved embodiments elsewhere in this Specification. However, although the busbar in each embodiment is thicker, the depth of each total key-to-busbar assembly is less. This is because in the original key-to-busbar assembly the length of the key's stem was stacked on top of the busbar's depth (see FIG. 3A), but in the improved assemblies the key's stem and the busbar's depth are arranged side to side. Thus no matter how efficiently these components are otherwise made, the new assembly will be less deep than the old; unless the later assembly somehow causes the key's stem or plunger to lengthen, which here it doesn't. Another aspect of these depth logistics is the relation between a key's stem length and its travel, that short but important vertical distance a key moves when it is pressed or activated. Typically a key's stem length equals its travel plus the length of its guides (the means by which the key is held in a vertical position as it travels). Thus if user ergonomics indicate that a keyboard key should have a travel of at least 2 mm (0.08 in.) to feel comfortable to most users and the length of its guides are added to this, the depth of the key's busbar can be considerably greater than one might think before it will increase the depth of the key-to-busbar assembly and thereby confer this added depth to the parent system as a whole. Thus it cannot be said of any computer on which this key-to-busbar assembly is mounted that the computer is made narrower at the expense of increasing its depth, no matter how great that depth may be for other reasons.

This improved key-to-busbar assembly allows the invention as a whole to be stronger, lighter, more attractive, more durable, and more economical than before. Both embodiments of this assembly are also more thoroughly and articulately described, which removes much of the anxiety that prospective manufacturers have previously expressed upon examining the Disclosed Invention.

As originally filed in this Invention's Patent and subsequently filed in its C.I.P. No. 1, the Disclosed Invention has its keyboard keys mounted in perfectly straight columns on its busbars in a \\\\\\ direction. But on a standard computer keyboard, each column of keys—say the 3 E D C keys—is not perfectly straight, which has led some commercial examiners of the Disclosed Invention to believe that the Disclosed keyboard when in open position might not duplicate normal typing as fully as is claimed.

But let's look at this seeming discrepancy more closely. If one lays a ruler along the upper right corners of the 3 E D C keys, or any other such column of keys on a standard keyboard, one will find that key E juts approximately 1.8 mm—about ¹⁄₁₆ in.—to the right of a line passing through the very corners of keys 3 and C, while key D falls about 1.8 mm short of this line. Such offsets tend to be similar on any standard keyboard.

Now on first thought one might say: simply put a few slight bends in the busbar. This adjustment, aside from increasing the cost of the invention a few cents, would not harm it in any way.

Then on second thought one might say: instead of changing the busbar move the stems of the "E" row keys 1.8 mm to the right and move the stems of the "D" row keys 1.8 mm to the left. This adjustment would be as easy as changing the busbar and still would not harm the invention in any way.

Then on third thought one might say: would this little difference really affect one's typing that much? 1.8 mm is less than one-tenth the distance between the centers of two keys—hardly wider than a hangnail.

Suffice it to say that whatever any further research indicates or any eventual manufacturer desires, any one of the solutions outlined above can easily be implemented in the Invention's final and most preferred embodiment.

As originally filed in this Invention's Patent, the Disclosed Invention shows the tops of its keys as being flat. But in a standard computer keyboard, each key typically has a slight side-to-side dish that enables a touch-typist's fingers to use the key more efficiently. Accordingly, the tops of the keys as shown in this Specification now have a slight lateral dish in their tops so they will look and operate more like standard keyboard keys.

As originally filed in this Invention's Patent and subsequently filed in its C.I.P. No. 1, the two side profiles of the keys in the Disclosed Invention have sharp points and indents. However, some examiners of the Disclosed Invention's original prototypes have expressed concern that such sharp 'sawtooth' or 'pinking shear' profiles may be tactilely and aesthetically undesirable to a considerable percentage of consumers. Accordingly, this Specification's latest Drawings shows the points and indents in the keys' side profiles as being rounder without reducing the indents' depth.

As originally filed in this Invention's Patent and subsequently filed in its C.I.P. No. 1, the Disclosed Invention has six rows of keys mounted on its laterally flexible assembly: row 1 which includes the function keys, row 2 which includes the number keys, row 3 which includes the q–p keys, row 4 which includes the a-1 keys, row 5 which includes the z–m keys, and row 6 which includes several operational keys and the spacebar. However, there is a logistical reason why the first and sixth rows can possibly be left off the keyboard's laterally flexible assembly. This is because the keys in these rows are not often used in touch-typing. Thus, since the ability to touch-type at top speed on a very small computer is perhaps the biggest single advantage of the Disclosed Invention, for economic reasons a manufacturer may choose to exclude rows 1 and/or 6 from the keyboard's laterally flexible assembly and instead fix these rows on the body of the parent system just to the front or back of the other keys. In fact, because one usually looks at a function key when using it, the keys in row 1 could be narrowed until they fit within the sides of a small computer. And by making the spacebar not quite as long, it too along with the control keys in its row could be made to fit within the sides of a small computer.

As originally filed in this Invention's Patent and subsequently filed in its C.I.P. No. 1, the disclosed keyboard has been described only as an "input" device. However, there are numerous industrial applications for the Invention in which its "keys" could be indicator lights, LED displays, and even television or computer monitors—wherein such "keys" actually function as output activators. Indeed, almost every standard keyboard has a few output activators. For example, if one presses the caps lock key, a light usually appears on the keyboard: that light is an output activator. The same is true for the NUM LOCK light, SCROLL LOCK light, and several other tiny indicator lights that appear on most laptop keyboards. Thus in the Specification and Claims of this Second Continuation In Part, the words "keyboard" and "key" connote both input and output; though input still has the stronger connotation. For these reasons the present Specification's broadest claim is for an "input/output device comprising a plurality of input/output activators", from which a narrower claim of a "keyboard in which said activators are alphanumeric/operational keys" depends.

Subsequent to this Patent's Second Continuation In Part (C.I.P. 2) which was submitted to the PTO on Aug. 4, 1999, the Inventor has made numerous additional improvements to the Disclosed Invention, in which said improvements both individually and colectively may be said to represent an additional embodiment, in part or in whole, of said Invention, and which together comprise a Third Continuation In Part (C.I.P. 3) of this Specification as follows:

1. The busbar has for the most part a channel-like cross-section wherein the channel's central web forms the bottom of the busbar and the channel's two end flanges extend upward as the busbar's sides to form a trough-like depression down the central portion of the busbar. This trough has a somewhat zigzag shape (see FIG. 29) which effectively widens the busbar without increasing its actual width, which provides more lateral room for the keys and their underlying circuitry to fit and work together.

2. Each circuitry ribbon that runs the length of each busbar lays flat in the bottom of the busbar's trough, and each ribbon has a similar somewhat zigzag outline as that of the trough it lays in. Each ribbon also has no creases in it which simplifies its manufacture, assembly, and operation.

3. A rubber-like row of domed switches, hereinafter called an elastomeric switch strip, fits on top of the portion of the circuitry ribbon that runs the length of each busbar and has a width and thickness that essentially fills the above-described trough of said busbar. Each dome in each elastomeric switch strip is located directly beneath a key mounted upon the busbar, so that when a key is depressed it depresses the elastomeric dome below it in a manner that pushes a small electrical contact on the dome's underside downward until said contact touches a pair of open circuitry terminals in a way that completes a circuit between these terminals which conducts electronic information to the parent computer that this particular key has been activated.

4. The elastomeric switch strip has a plurality of projections along its edges which fit into corresponding indents along the inside edges of the trough in the busbar; this interlocking of switch strip projections and busbar indents (1) keeps any portions of the switch strip from potentially creeping upward during the life of the keyboard and reducing the travel of the keys while they were continually being used, (2) holds the circuitry ribbon laying the busbar trough securely in place and by concealing the ribbon also protects it from possible damage, and (3) prevents microdebris from entering the crucial contact voids between each dome and the circuitry ribbon under each key.

5. The above essentially flat and longitudinal arrangement of each switch strip and circuitry ribbon in each busbar trough allows two portions of each busbar's length to be displaced laterally in a manner that enables the second key from the front of each busbar to be located about $\frac{1}{16}$ in. to the left of the busbar's center and the third key from the front to be about $\frac{1}{16}$ in. to the right of the busbar's center, as such front-to-back nonalignment of these two keys on each busbar is the same as their arrangement on a standard computer keyboard; thus this nonalignment comprises the most familiar arrangement of all the keys on the keyboard and as such makes the keyboard slightly easier to use.

6. The number of keys mounted on each busbar is five, in which the sixth or front-most row of keys customarily found on a computer keyboard (the row that includes the spacebar and several operational keys) are stationary; that is, they do not move in and out as the expandable keyboard is opened and closed. The function keys that form the keyboard's rearmost row of keys are also the same size as the alphanumeric keys, which makes them more usable than the diminutive function keys that typically appear on today's handheld computers.

7. The collector locus of circuitry ribbon wires that run in the trough of each busbar (from which collector locus said wires extend to and from the collector loci of adjacent busbars in a manner that forms a plurality of continuous circuits between the keys on each busbar and the parent computer) is not at the very back of the each busbar but is situated between the two rearmost keys of each busbar.

8. The total matrix of circuitry ribbons for the whole keyboard is divided into two parts: a right half and a left half. The right half contains seven "fingers" whose somewhat zigzag outlines lay in the seven rightmost busbars of the keyboard, a series of "bridges" that interconnects these seven fingers near the rear of the busbars, and a "tab" that extends from the central rear portion of the keyboard toward an electronic connection in the parent computer; and the left half is essentially a mirror-image of a similar number of fingers, bridges, and one tab. This arrangement of the keyboard's microcircuitry allows it to be manufactured and assembled easily and economically.

9. The means of supporting the outermost portions of the keyboard when they extend beyond the left and right sides of the parent computer when said keyboard is opened is achieved not by underlying outriggers or legs but by considerably increasing the depth of the outermost braces that lay beneath the busbars and interconnect them.

10. The means of achieving the keyboard's maximum width when in open position is achieved by a continuous steel "U-spring" located under the keyboard's busbars and above its braces. This one part not only simplifies the manufacture, assembly, and operation of the Disclosed Invention, it allows a user to open the keyboard by merely lifting the keyboard's closed ends slightly—then suddenly the keyboard springs out to its open position. Then to close the keyboard, one merely applies a slight lateral pressure against its sides which compresses the Z-spring's segments which returns the keyboard to its closed position.

In summary the above-described improvements make the Disclosed Invention more easy to manufacture, easier to operate, stronger, more durable, and more economical than ever before.

Taking all the above into consideration, the primary advantage of the Disclosed Invention is that it allows 'laptop' and 'palmtop' computers and similar lightweight or mobile electronic devices with alphanumeric keyboards to be made nearly as small as a paperback or videocassette while allowing their keyboards to be used with the same skill and precision as those of full-size desktop computers. For example, with this Invention you can enter a conference with a computer hardly bigger than a paperback, open its keyboard, then while looking at someone talking you can touch-type at top speed. You can't perform this basic business activity on any other kind of computer today. For a second example, with one hand you can reach for a paperback-sized computer on a surface several feet to your left, then with a broad sweep of this one hand you can carry this lightweight object to a place several feet to your right, then sit down and immediately begin touch-typing at top speed. If you tried this with a standard-sized laptop you could dislocate your shoulder. Such a sweeping motion is a basic ergonomic movement which one cannot perform while holding any other kind of computer that has a full-size keyboard. In this and many other ways, the Disclosed Invention makes computers evanescently mobile, incredibly versatile, anytime, anywhere. Indeed, it makes the miniaturization of computers practical. Such economies of size should also lead to corresponding economies of price.

A further advantage of the Disclosed Invention is that its keys remain fully operable even when in closed position—an advantage that cannot be enjoyed with the above-cited U.S. Pat. Nos. 3,940,758 and 5,187,644 or indeed with any other open-and-close keyboard today. Thus the Disclosed Invention retains one of the greatest advantages of palmtop computers: that a standing user can easily hold such a device in a single hand while operating its keys with the other—and in so doing use the device while interviewing someone, inventorying shelved merchandise, walking down a hallway, or even while leaning against the rail of a moving walkway in an airport. A standing user can also quickly sit down with such a pint-sized computer, open its keyboard, and immediately begin touch-typing at top speed. Such standing-then-seated operation is another common business activity—one associated with taking notes then immediately summarizing said notes while the note-taking is still fresh in mind—that cannot be performed with any other computer today.

A further advantage of the Disclosed Invention is that the deeply profiled edges of its individual keys may serve as a more tactile aid to a typist than the usual smooth-sided keys, which may actually lead to speedier and more accurate data entry.

A further advantage of the Disclosed Invention is that it should eliminate the tendency of present makers of palmtops and other small computers to remove certain keys which may be important to some users of desktop models in efforts to create a more compact keyboard.

A further advantage of the Disclosed Invention is that it allows computers of present desktop or laptop capability to be made much lighter. Indeed, recent advances in computer microelectronics when combined with the Disclosed Invention would enable a hand-sized computer with a full-size keyboard to have 32 MB of RAM, a 256-color display, PC card slots, serial interfaces, and built-in batteries and allow one to "run Windows® anywhere" and communicate via Email—wirelessly or otherwise—while weighing hardly half a kilogram. Never before has such a versatile computer been able to be so evanescently mobile.

A further advantage of the Disclosed Invention is that the keys' deeply indented profiles may impart an eye-catching character to the device in which they are installed, which should make such devices highly marketable.

A further advantage of the Disclosed Invention is that it has more applications than being mounted on small computers, only a sampling of which are listed below:

1. Several companies and numerous individuals have expressed a desire to adapt the Disclosed Invention into an open-and-close keyboard that can operate palm-sized pen-input devices, in which the Disclosed Invention would be hardly bigger than a cigarette case. Such a stand-alone keyboard would also make a nice accessory for owners of present handheld computers.
2. A maker of "ruggedized notepads", an electronic writing tablet about 5×8 inches in size, has expressed a desire to install the Disclosed Invention under his notepad's display, so users can pull the closed keyboard out from under the display then open it and begin typing as if they were at a desktop computer.
3. A numeric keypad could be added to the disclosed keyboard so that when closed the whole keyboard fits within the width of a standard-sized laptop computer, and when open the laptop would have in addition to its standard keys a numeric keypad. A variation of this keyboard would also work as a portable cash register.
4. The Disclosed Invention's alphanumeric and operational keys could also be indicator lights, LED displays, even television or computer monitors, and they could be almost any size, and arrays of any combinations thereof could be configured as tightly arranged input/output activators mounted in auto or airplane dashboards, control room panels, and numerous industrial applications—then such arrays could pop forward with a slight touch and be opened into usable displays. Such open-and-close arrays would allow a greater number of controls to be installed in smaller instrument panel areas.

Although extreme latitude exists regarding the optimal sizing and configuring of the Disclosed Invention's many elements, in which any one element when considered individually may not necessarily represent a particular embodiment of any portion of the Invention as described herein, each such element when considered in terms of its essence or conceptual nature may be said to be part of one or more particular embodiments of the Disclosed Invention, as follows:

BRIEF DESCRIPTION OF THE DRAWINGS

FIG. 2 is a section through the parent computer or the like showing the front of the keyboard and its underlying laterally flexible assembly with their left halves shown in open position and their right halves in closed position.

FIG. 3 is a left side view of the keyboard and its underlying laterally flexible assembly shown in open position wherein their back and front edges when closed (1-C and 10-C) are shown in dotted lines. A right side view of this assembly is essentially a mirror image of the left side view.

FIG. 3A is an enlarged section thro' one of the laterally flexible assembly connectors which in this embodiment also serves as a positional guide and electrical contact between the keyboard and the parent system below, in which a typical schematic of the microcircuitry from any key to the parent system's operational circuitry is also shown.

FIGS. 6-OPEN and 6-CLOSED show open and closed views of a flexible flat ribbon which in this particular embodiment is connected to adjacent busbars in open and closed position.

FIGS. 7-OPEN and 7-CLOSED show open and closed views of a W-shaped flexible flat ribbon which in this particular embodiment is connected to adjacent busbars in open and closed position.

FIGS. 10-OPEN and 10-CLOSED show open and closed views of two adjacent braces with integral hooks or latches on their sides which in this particular embodiment limit the keyboard's maximum width when it is open.

FIGS. 11-OPEN, 11-CLOSED and 11-SEC show open, closed, and sectional views of the rows of sliding slotted stops on the laterally flexible assembly's underside which in this particular embodiment limit the keyboard's maximum width when it is open. FIG. 11–54 is an enlarged view of one sliding slotted stop.

FIG. 12 includes four views of a spacebar handle assembly which in this particular embodiment enables the spacebar to lift up to facilitate opening and closing of the keyboard and/or press down to hold the keyboard secure when being used. FIG. 12-EXP is an exploded view of this assembly, FIG. 12-UP is a section thro' this assembly when the spacebar is up, FIG. 12-DOWN is a section thro' this assembly when the spacebar is down, and FIG. 12-SEC is a lateral section thro' this assembly when the spacebar is down.

FIGS. 13-DOWN and 13-UP are sections thro' the right and left halves of the spacebar that show a spring mechanism beneath it which moves this elongate key slightly upward when the keyboard is opened or closed.

FIGS. 14-OPEN and 14-CLOSED show open and closed views of an outrigger which in this particular embodiment supports the outer portions of the keyboard when it is open. FIG. 14-SEC is a section thro' the outrigger's inner end in closed position, and FIG. 14-END is an end view of the outrigger assembly in open or closed position.

FIGS. 15-OPEN and 15-CLOSED show open and closed views of a leg which in this particular embodiment supports the outermost portions of the keyboard when it is open. 15-END shows an end view of the leg as it appears in open or closed position.

FIG. 16A is a top view of a particular embodiment of a typical key-to-busbar assembly, and FIGS. 16B, 16C, and 16D are plan sections of the same.

FIG. 17 is an exploded perspective view of the same key-to-busbar assembly shown in FIG. 16, in which FIG. 17A is a worm's-eye (looking up) view of a key, FIG. 17B is a bird's-eye (looking down) view of a generally unitary portion of a printed circuitry ribbon, and FIG. 17C is a bird's-eye view of a similar portion of a busbar.

FIGS. 18A, 18B, 18C, and 18D are four lateral sections thro' the same key-to-busbar assembly shown in FIGS. 16 and 17.

FIGS. 19A, 19B, 19C, and 19D are four longitudinal sections thro' the same key-to-busbar assembly shown in FIGS. 16, 17, and 18.

FIG. 20A is a top view of a second embodiment of a typical key-to-busbar assembly, and FIGS. 20B, 20C, and 20D are plan sections of the same.

FIG. 21 is an exploded perspective view of the same key-to-busbar assembly shown in FIG. 20, in which FIG. 21a is a worm's-eye view of a key, FIG. 21B is a bird's-eye view of a generally unitary portion of a printed circuitry ribbon, and FIG. 21C is a bird's eye view of a similar portion of a busbar.

FIGS. 22A, 22B, 22C, and 22D are four lateral sections thro' the some key-to-busbar assembly shown in FIGS. 20 and 21.

FIGS. 23A, 23B, 23C, and 23D are four longitudinal sections thro' the same key-to-busbar assembly shown in FIGS. 20, 21, and 22.

FIGS. 24A and 24B are four worm's eye perspective views of a keyboard key which shows four embodiments of the stem or prong projecting from the key's underside.

FIGS. 25A and 25B show two views of the electrical contacts under each key which close one or more electrical circuits between the key and the parent system when the key is depressed.

FIGS. 26A, 26B, and 26C are several views of the electrical contacts and a portion of a printed circuitry ribbon which close a circuit between each key and the parent system when the key is depressed.

FIG. 27 is a sampling of the great variety of input/output activators that can be mounted on the laterally flexible assembly of the Disclosed Invention.

FIG. 28 is a drawing that describes the orthogonal terminology used in this Specification and its Claims, in order that any confusion that may arise regarding certain directional aspects of the Disclosed Invention may be eliminated.

FIGS. 29A, 29B, 29C, and 29D are perspective views of a third embodiment of a typical key-to-busbar assembly. FIG. 29A shows a column of five typical keys that are mounted on the busbar, FIG. 29B shows the 5-domed elastomeric switch strip located directly beneath the keys and which fits into the zigzag-shaped trough of the busbar below, FIG. 29C shows the circuitry ribbon that lays below the switch strip and which also fits into the zigzag-shaped trough of the busbar below, and FIG. 29D shows a typical busbar of the expandable keyboard. These four views are arranged vertically to depict an exploded-assembly view of the total key-to-busbar assembly.

FIG. 30 is a plan section thro' a typical key-to-busbar assembly.

FIG. 31 is a vertical sectional view thro' a typical key-to-busbar assembly, in which the key and the domed switch strip directly below appear in solid lines in their "up" or unactivated position and these parts appear in dotted lines in their "down" or activated position.

FIGS. 32A and 32B are underside views of three typically adjacent busbars and the Z-spring that makes the keyboard spring apart when one tries to open it and which also limits the keyboard's maximum width when in open position.

FIG. 33 is a top view of the left half of the circuitry ribbon that communicates the electronic signals from each activated key in the left half of the keyboard to the parent computer. The circuitry ribbon of the right half of the keyboard is essentially a mirror-image of the left half.

FIGS. 1 to 4 above appeared in the Disclosed Invention's original Patent, FIGS. 5 to 15 appeared in C.I.P. 1, FIGS. 16 to 28 appeared in C.I.P. 2, and FIGS. 29 to 33 appear as a previously undisclosed portion of this C.I.P. 3.

In FIGS. 1 to 33 the following numbers and letters denote various parts and portions of the Disclosed Invention, wherein the same numbers and letters identify the same parts and portions throughout. In this nomenclature the terms computer, parent system, electronic system, electronic device and the like are interchangeable.

1. Keyboard, also input/output device. 1L-O=left side of keyboard 1 in open position. 1R-C=right side of keyboard 1 in closed position. 1R-O=right side of keyboard 1 in open position.
2. Single key in keyboard 1, also input/output activator or activator. In FIG. 5 each key is also denoted by the actual letter it types and the letter is placed within a circle; i.e. the "T" key appears as (T). 2-O=position of key 2 when keyboard 1 is in open position. 2-C=position of key 2 when keyboard 1 is in closed position.
3. Longitudinal (front-to-back) depth of any key 2.
4. Total lateral (side-to-side) width of any key 2.
5. Side edge of key 2.
6. Indented side profile of key 2. 6T=tip(s) in indented profile 6. 6-I=indent(s) in indented profile 6.
7. Minimum indent width of key 2.
8. Top or tactile surface of key 2.
10. Laterally flexible assembly. 10L-O=left side of laterally flexible assembly 10 in open position. 10R-C=right side of laterally flexible assembly 10 in closed position. 10R-O=right side of laterally flexible assembly 10 in open position.
11. Spinebar: centermost busbar 12 in keyboard 1.
12. Busbar of laterally flexible assembly 10, also microbusbar or bar. 12-O=position of busbar 12 when keyboard 1 is open. 12-C=position of busbar 12 when keyboard 1 is closed. 12-IS=indent in side of busbar 12. 12S=side(s) of busbar 12. 12V=substantially vertical guide surface(s) on side of busbar 12. 12U=substantially flat underside of busbar 12.
13. Slight indent on underside 12U of busbar 12.
14. Brace of laterally flexible assembly 10.
16. Connector(s) of busbar 12 and brace 14. 16B=back connector. 16C=center connector=16C. 16F=front connector. 16H=connector hole.
17. Microcircuitry, also circuitry or microconductor. 17U= ~in Disclosed Invention. 17L=~in parent system.
18. Laterally flexible assembly handles. 18L-O=left handle in open position. 18R-C=right handle in closed position.
19. Indent on each laterally flexible assembly handle 18.
20. Computer body, also computer frame, frame of computer, frame of parent system, or frame of computer or other electronic system. 20T=top of~. 20-1=indent that receives spacebar handle assembly 60.
21. Surface that parent system is situated on, also parent system's resting surface, surface that supports parent system as it is being used, computer's resting surface, surface that supports computer as it is being used, etc.
22. Back of computer frame 20.
24. Side of computer frame 20. 24L=left side. 24R=right side.
25. Outrigger encasement: portion of parent system body 20 that envelopes sliding inner end of outrigger 90 when outrigger 90 is in closed position. 25V=encasement void in ~.
26. Front of computer or parent system frame 20.
27. Back keyboard supports, also upper keyboard support 27L-O=left side in open position. 27R-O=right side in open position=27R-O.
28. Front keyboard supports, also lower keyboard support. 28L-O=left side of front keyboard supports 28 in open position. 28R-O=right side of front keyboard supports 28 in open position.
29. Keyboard support indent in side of computer or parent system body 20.
33. Projecting positional guide on underside of connector 16F.
34. Indented positional guides in computer or parent system chassis 35. 34-O=guide that receives projecting guide 33 when keyboard is in open position. 34-C=guide that receives projecting guide 33 when keyboard is in closed position.
35. Computer or parent system chassis.
36. Shaft of connector 16.
37. Flange or boss of connector 16.
38. Bushing around shaft 36 of connector 16.
39. Circuitry inside computer or parent system body 20.
40. Flexible circuitry ribbon. Also flexible flat cable, flexible flat ribbon conductor, flexible flat ribbon, or printed circuitry ribbon. 40R=right half of flexible circuitry ribbon 40. 40L=left half of flexible circuitry ribbon 40.
41. Edge of flexible circuitry ribbon 40 that fits snugly into trough 192 of busbar 12.
42. Plug at end of flexible flat ribbon conductor.
43. Finger-like extension of flexible circuitry ribbon 40 that fits into trough 192 of busbar 12.
44. W-shaped flexible flat ribbon conductor. Also W-shaped flexible flat ribbon.
45. Bridge segment of flexible circuitry ribbon 40 that extends between two adjacent busbars 12.
46. Plug at end of W-shaped flexible flat ribbon conductor.
47. Tab-like portion of flexible circuitry ribbon 40 that extends from ribbon 40 to connecting interface 147 that plugs into parent computer circuitry 39.
48. Infrared (IR) or wireless driver microchip with drive circuit, also driver microchip or driver chip.
49. Infrared (IR) or wireless photodiode. 49S=sender photodiode. 49R=receiver photodiode.
50. Integral hook or latch on side of brace 15.
51. Indent on side of hook 50.
52. Projecting face in side of hook 50 that mates with indented surface 53 in side of adjacent or interlocking hook 50.
53. Indented surface in side of hook 50 that receives projecting face 52 in side of adjacent or interlocking hook 50.
54. Sliding slotted stop, also slotted stop, sliding stop, or stop. 54W=web of ~. 54F=flange of ~.
55. Screw or similar connector that fastens sliding slotted stop 54 to brace 14.
56. Elongate hole in end opposite hole 57 in web 54W of sliding slotted stop 54.

Figure 1:
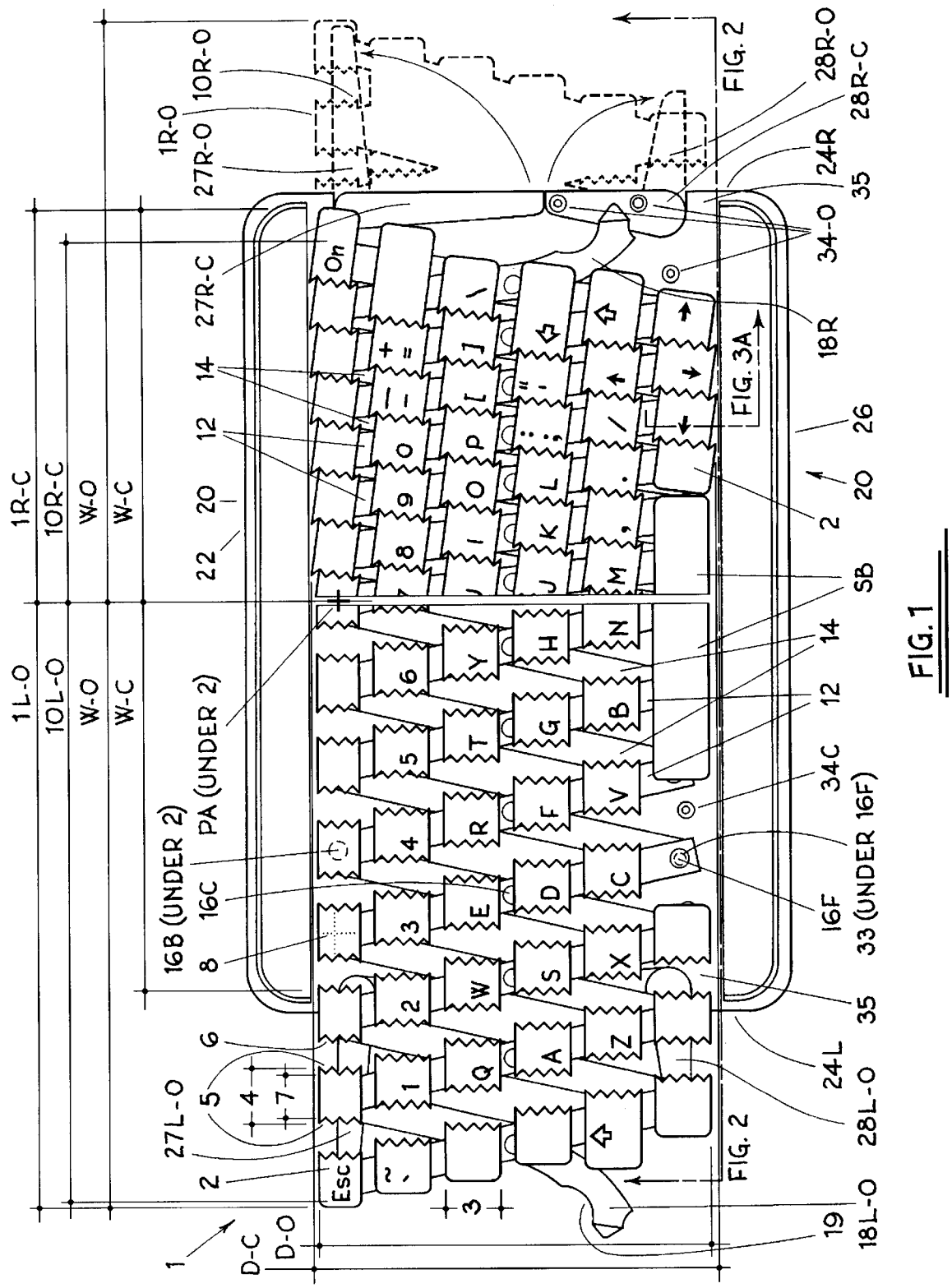
FIG. 1 is a top view of the keyboard and its underlying laterally flexible assembly with its left half in open (expanded) position and its right half in closed (contracted) position.

57. Hole in end opposite elongate hole 56 in web 54W of sliding slotted stop 54.
58. Trench in computer or parent system top 20T that provides riding room for sliding slotted stops 54.
60. Spacebar handle mechanism or assembly.
62. Spacebar, also spacebar key or key. This part is also number SB.
64. Spacebar base. 64UF=upper flange of spacebar base 64. 64UF=lower flange of spacebar base 64.
66. Double torsion spring in lower flange 64LF of spacebar base 64.
68. Shaft that fits into lower flange 64LF of spacebar base 64.
69. Connector between spacebar base 64 and handle 70.
70. Handle that raises or lowers spacebar 62. 70F=handle lever of handle 70.
72. Spacers between handle 70 and handle base 74.
74. Handle base. 74N=notch in handle base 74. 74C=downward-projecting catch in handle base 74.
76. Handle case. Side flanges=76F.
78. Catch spring in handle case 76.
82. Spring/catch mechanism beneath spacebar 62.
83. Upper catch descending from underside of spacebar key 62 that engages lower catch 84. 83U=upper face that mates with lower face 84L. 83L=lower face that mates with upper face 84U.
84. Lower catch rising from computer or parent system top 20 that engages upper catch 83. 83L=upper face that mates with lower face 83L. 84L=lower face that mates with upper face 83U.
86. Spring that pushes spacebar 62 upward (i.e. away from lateral surface of keyboard).
88. XY decoder located in parent system 20.
90. Outrigger that supports outermost keys 2 when in open position. 90-I=inner or sliding end of outrigger 90. 90-O=outer or supporting end of outrigger 90.
92. Connector between outrigger 90 and underside of laterally flexible assembly 10.
96. Leg that supports outermost keys 2 when keyboard 1 is open. 96T=top of leg 96. 96S=shaft of leg 96. 96F=foot of leg 96.
98. Connector of leg 96 to underside of laterally flexible assembly 10.
102. Longitudinal guides under sides of key 2. 102-L=longitudinal guide under left side of key 2. 102-R=longitudinal guide under right side of key 2.
103. Dish or concavity in lateral (side-to-side) dimension of key 2.
112. Longitudinal guides on top of busbar 12. 112-L=longitudinal guide on top of left side of busbar 12. 112-R longitudinal guide on top of right side of busbar 12.
114. Intermittent projection(s) along the tops of busbar 12.
116. Busbar prong rising from busbar 12 or extending from busbar prong flange 136. 116B=widened base of busbar prong 116. 116P=projection(s) on busbar prong 116. 116S=sloping surface on busbar prong projection 116P that mates with sloping surface 118S on key prong projection 118P.
118. Key prong descending from the underside of key 2. 118P=projection(s) on end of key prong 118. 118S=sloping surface on key prong projection 118P that mates with sloping surface 116S on busbar prong projection 116P.
119. Fin(s) or projection(s) along key prong 118.
120. Key guide(s) or key guide surface(s) located on busbar 12.120B=widened base of key guide 120.
121. Fin(s) projecting along the length of key prong 118.
122. Pendant descending from key 2.
124. Electrical contact(s) or conductor(s) located on tip of pendant 122 or underside of key 2.
126. Inset in computer or parent system body 20 that receives outrigger 90. 126L=inset that receives leg 96.
127. Extensive (as opposed to compressive) elastic member that depresses when key 2 is activated and returns key 2 to its normal position after being activated. Also elastic member.
128. Buttress between key guides 120. 128P=peak of buttress 128. 128S=sloping upper side(s) of buttress 128. 128V=vertical key guide surface on buttress 128.
130. Printed circuitry ribbon that conducts electronic data from each key 2 to parent system circuitry 39.
131. Microconductor(s) or very small wire(s) in printed circuitry ribbon 130.
132. Open circuitry terminals in flexible circuitry ribbon 40 or 130 that are closed by electrical contacts 124 under key 2 when key 2 is depressed or activated. 132C=individual or multiple contacts in open circuitry terminal 132. 132P=sheet of nonconductive material in open circuitry terminal 132.
133. Slot that accepts and holds in place the bottom of printed circuitry ribbon 130.
134. Cavity or cavities in busbar 12 located below intermittent projection(s) 114.
135. Cavity or cavities in busbar 12 located below key prong(s) 118.
136. Prong flange that rises from shelf 138 and supports busbar prongs 116. 136V=vertical key guide surface on the end of prong flange 136.
138. Shelf that extends from side of busbar 12 and supports prong flange 136.
140. Post that rises from shelf 138 and holds in place the bottom of elastic member 127.
141. Rounded surface(s) that enclose elastic member 127 on busbar 12.
142. Cavity beneath buttress 128.
144. Layer of adhesive between circuitry ribbon and top of busbar.
146. Cavities on each side of shelf 138.
147. Connecting interface of tab 147 of flexible circuitry ribbon 40 that plugs into parent computer circuitry 39.
150. Wider projections on fins 119.
152. Spacer between open circuitry terminal 132 and electrical contact 124.
154. Collector locus of microconductors 131 on busbar 12.
155. Central collector locus of microconductors 131 on laterally flexible assembly 10 of keyboard 1.
158. Column of input/output activators or keys 2 in input/output device or keyboard 1.
160. Hexagonal activators in tiled plane shown in FIG. 27A.
162. Indicator lights on activators shown in FIG. 27.
164. First regular polygonal activator shown in FIG. 27B.
166. Second regular polygonal activator shown in FIG. 27B.
168. Rhomboidal activators shown in FIG. 27C.
170. Parallelogramic activators shown in FIG. 27E.
172. Decorative polygonal activators shown in FIG. 27F.
174. Television or computer monitor shown in FIG. 27G.
175. Controls on television or computer monitor 174.
176. Slider control shown in FIG. 27H.
177. Spring-activated pop-up scale on slider control 176.
178. Small plunger on the underside of slider control 176.
180. Elastomeric switch strip.
182. Dome of elastomeric switch strip 180.
183. Dome cap of elastomeric switch strip dome 182.
184. Projection(s) on side(s) of elastomeric switch strip 180.

186. Indent(s) on side(s) of trough 192 in busbar 12.
188. Torso, length, or generally elongate portion of elastomeric switch strip 180.
190. Extension on each side of elastomeric switch strip 180 that fits over flexible circuitry ribbon bridge 45.
192. Trough in busbar 12 into which fits flexible circuitry ribbon 40 and elastomeric switch strip 180.
194. Lateral displacement of busbar 12 that allows one or more of keys 2 in each column of keys 2 to be arranged slightly out of a nearly front-to-back alignment as they appear on a standard computer keyboard.
198. Indents on busbar 12 that receive elastomeric switch strip extension 190 and flexible circuitry ribbon bridge 45.
200. Continuous U-spring located between busbars 12 and braces 14 of keyboard 1.
222. Cavity on top of dome cap 183 that receives key pendent 122.
A. Top view of standard keyboard key.
D-O. Longitudinal depth (front-to-back dimension) of keyboard 1 when open.
D-C. Longitudinal depth (front-to-back dimension) of keyboard 1 when closed.
CL. Closed position of innermost part of outrigger inner end 90-O.
G. Gap between spacebar's normal resting position and its lowermost position during normal inputting activity.
H. Height of chamber that houses elastic member 127 between key 2 and busbar 12.
OP. Open position of innermost part of outrigger inner end 90-O.
PA. Pivot anchor of keyboard 1 and laterally flexible assembly 10 under key F7.
S. Small space between the sides of two keys 2 when keyboard 1 is closed.
SB. Spacebar in central front part of keyboard 1. This part is also number 62.
W-O. Lateral width (side-to-side dimension) of keyboard 1 when open.
W-C. Lateral width (side-to-side dimension) of keyboard 1 when closed.
X. X or row (generally lateral) microconductors in microcircuitry 17 (these conductors are also numbered X1, X2, X3 . . . X6). Also conductors or wires.
Y. Y or column (generally front-to-back) conductors in microcircuitry 17 (these conductors are also numbered Y1, Y2, Y3 . . . Y7). Also conductors or wires.

DETAILED DESCRIPTION AND OPERATION OF THE INVENTION

Referring to the accompanying Drawings that describe a particular embodiment of the Disclosed Invention in detail and initially to FIG. 1 thereof: This top view shows the left half of keyboard 1 and its underlying laterally flexible assembly 10 in extended or open position and its right half in contracted or closed position, wherein the division between the two half views occurs at the centrally located pivot anchor PA, wherein each key 2 (not including space bar SB in the bottom row) has a typical alphanumeric or operational notation on its top or tactile surface 8. In this view, the keyboard's front-to-back dimension decreases only slightly from D-C to D-O as its lateral or side-to-side dimension increases greatly from W-C to W-O when the keyboard is extended from closed to open position. This figure also shows in dotted lines the outline of the right half of said keyboard when it is open (1R-O and 10R-O) and the outlines of the two legs 27R-O and 28R-O that extend from the parent system's right side to support this side of the keyboard when it is open.

Referring to keyboard 1: each key 2 has a front-to-back depth 3, total side-to-side width 4, and side edges 5, wherein at least one of side 6 that allows two adjacent keys to interlock at an indent width 7 which is less than the key's total width 4. Indent width 7 allows keys 2 to have the same center-to-center spacing as standard keyboard keys when keyboard 1 is in open position while allowing the center-to-center spacing of keys 2 to be much less when keyboard 1 is in closed position. Regarding spacebar SB, this elongate key centered in the front row of keyboard 1 is connected to computer body front 20F so its tactile surface remains stationary whether all the other keys 2 are opened or closed, since such extension of keys 2 causes said keys 2 to rotate slightly (which is desirable for them as explained further below) while such rotation is undesirable for the elongate spacebar SB. However, in other equally valid embodiments, part of spacebar SB can be rotatably anchored to part of underlying laterally flexible assembly 10 while another part of spacebar SB is slidably anchored to another part of assembly 10.

Referring to the keys' laterally flexible assembly 10: this multiple-X network is constructed primarily of substantially planar and parallel busbars 12 (whose backs in FIG. 1 are oriented slightly to the left of their fronts: i.e. \\\\\\, a similar but not necessarily exact number of braces 14 (whose back ends in FIG. 1 are oriented slightly to the right of their front ends: i.e. //////), and three rows of connectors 16 located where the backs of busbars 12 and braces 14 intersect (connectors 16B), where their centers intersect (connectors 16C) and where their fronts intersect (connectors 16F). Busbars 12 support keys 2 mounted thereon and include the microcircuitry that conducts electronic data from any activated key 2 to the parent system's circuitry 39, while braces 14 are made of a material that adequately stabilizes busbars 12 and supports keys 2 when keys 2 are activated. Connectors 16 intertransfer the required stability between braces 14 to busbars 12, allow busbars 12 to rotate against braces 14 when keyboard 1 is opened or closed, and carry the microcircuitry that conducts electronic data from any depressed key 2 to the parent system's circuitry 39.

In this embodiment, the back connector 16B approximately under key F7 (the centermost key in the top row of keys) descends to form an essentially vertical pivot anchor PA that keeps the keyboard connected to the parent system and holds the portion of keyboard 1 at point PA stationary while the keys to the right and left of this point are opened or closed; wherein the upper portion of pivot anchor PA allows its proximate busbar 12 and brace 14 to rotate slightly about said vertical axis while the lower portion of pivot anchor PA is anchored in the computer body 20 that underlies laterally flexible assembly 10. In other embodiments, pivot anchor PA can be located at the bottom of the total keyboard/laterally flexible assembly instead of the top.

In this embodiment, keyboard 1 and laterally flexible assembly 10 are positioned accurately when in open or closed position by projecting positional guides 33 on the undersides of connectors 16F, wherein all of guides 33 mate with a row of indented positional guides 34-C located on computer body 20 when laterally flexible assembly 10 is in closed position, and all of guides 33 mate with another row of indented positional guides 34-O on computer body 20 when laterally flexible assembly 10 is in open position. In other embodiments, guides 33 and 34 can be located under the top of laterally flexible assembly 10 instead of at the bottom.

In this embodiment, guides 33 and 34 also conduct electronic data from any depressed key 2 to the parent parent system's circuitry 39 through electrical contacts located on the mating surfaces of guides 33 and 34. This is shown in FIG. 3A, an enlarged section through a front connector 16F which includes a schematic of the microcircuitry between key 2 and the parent system's circuitry 39, wherein microconductors 17U conduct electronic data from any depressed key 2 through busbar 12, brace 14, connector 16F, and projecting positional guide 33 to microcircuitry 17L in indented positional guide 34 and eventually parent system's circuitry 39. In other embodiments, electronic data from keys 2 can be conducted through back connectors 16B instead of front connectors 16F, or said conductance could occur via wireless means (i.e. infrared or remote control) directly from keys 2 or busbars 12 to the parent system's circuitry 39.

In this embodiment, the rightmost busbar 12 and leftmost brace 14 of assembly 10 extend toward the keyboard's front to form two handles 18R and 18L which facilitate the opening and closing of keyboard 1, wherein each handle 18 has indents 19 that allow the tips of one's fingers to more easily grasp the ends of handles 18. In other embodiments handles 18 could have indents, pads, projections, or any combination thereof that would further facilitate the opening and closing of keyboard 1.

Referring to computer body 20 around and under keyboard 1: although computer body 20 can have many sizes and configurations (or even lack thereof), in this embodiment computer body 20 has two back keyboard supports 27L and 27R and two front keyboard supports 28L and 28R. Back supports 27L and 27R extend from the vicinity of computer body 20's back left and right corners to provide support for the rearmost and outermost keys 2 when keyboard 1 is in open position, while front supports 28L and 28R extend from the vicinity of computer body 20's front left and right corners to provide support for the frontmost and outermost keys 2 when keyboard 1 is in open position. In this embodiment, front keyboard supports 28L and 28R also have on their tops the outermost indented positional guides 34 that receive the corresponding projecting positional guides 33 on the underside of laterally flexible assembly 10 when keyboard 1 is in open position.

Referring to FIG. 2 of the Drawings: This frontal section shows the left half of keyboard 1 and laterally flexible assembly 10 in open position and the right half in closed position. In particular this view shows keys 2 mounted on the plurality of busbars 12, the plurality of braces 14 just below, projecting positional guides 33 that mate with indented positional guides 34 (outlined in dotted lines) located in computer body 20, and left keyboard supports 27L-O and 28L-O in open position. The right half of this view shows in dotted lines the open position of keyboard 1R-O, laterally flexible assembly 10R-O, and right keyboard braces 27R-O and 28R-O.

Referring to FIG. 3 of the Drawings: This left side view of the keyboard 1 and laterally flexible assembly 10 in open position shows the leftmost keys 2 mounted on the leftmost busbar 12, leftmost brace 14 just below which includes projecting handle 18L-O, left keyboard supports 27L-O and 28L-O in open position, and the leftmost projecting positional guide 33 which mates with the leftmost indented positional guide 34-O (shown in dotted lines) in computer body 29. Also shown in dotted lines is the leftmost indented positional guide 34-C in computer body 20 which receives said projecting positional guide 33 when the keyboard/ scissor linkage assembly is in closed position. This view also shows in dotted lines the position of keyboard 1-C and laterally flexible assembly 10-C in closed position. A right side view of this assembly is essentially a mirror image of the left side view.

Referring to FIG. 3A of the Drawings: As explained above, this is an enlarged section through a front connector of the keyboard's laterally flexible assembly.

Figure 4:
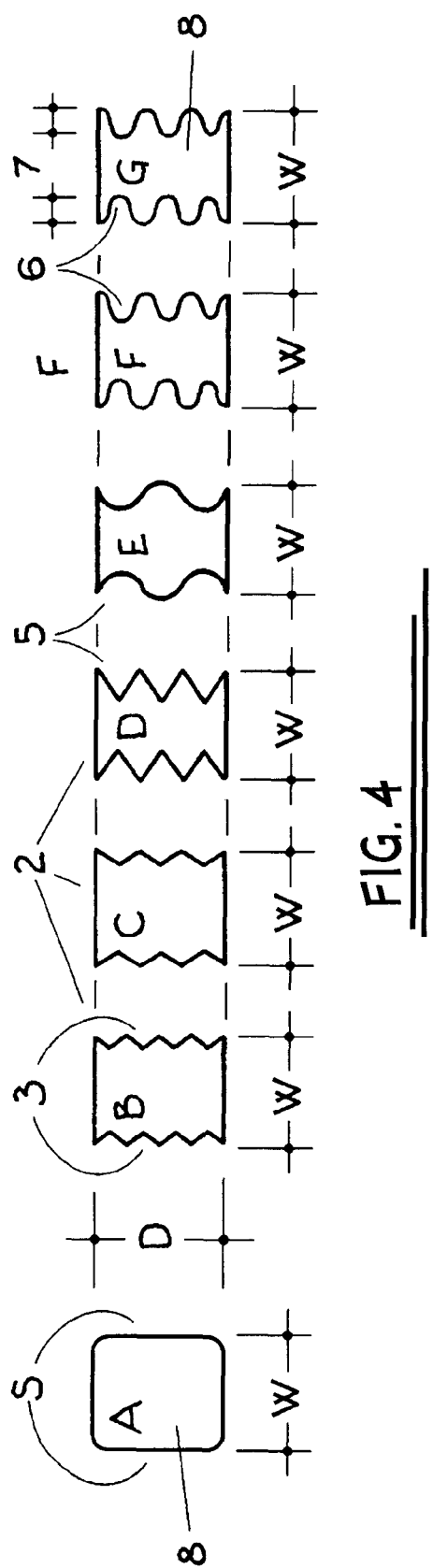
FIG. 4 shows top views of several individual keys, wherein key A is of standard shape while the other keys to the right have side edges with various interlocking pro-files as typified in the Disclosed Invention.

Referring to FIG. 4 of the Drawings: In this top view of several keyboard keys, key A is an outline of a typical 'Chiclet' style key from a standard computer keyboard. Note the rectangular aspect of key A's top surface, its standard depth or front-to-back dimension D, its standard width or side-to-side dimension W, and its straight side edges. Then note that the other keys to the right have the same depth and width as key A, but their sides have various indented profiles 6 which allow any two of said other keys having matching profiles to interlock so their centers will be closer together than could occur with two side-to-side keys A. These keys can have a variety of other configurations without any diverging from the nature of what has been described herein.

Figure 5:
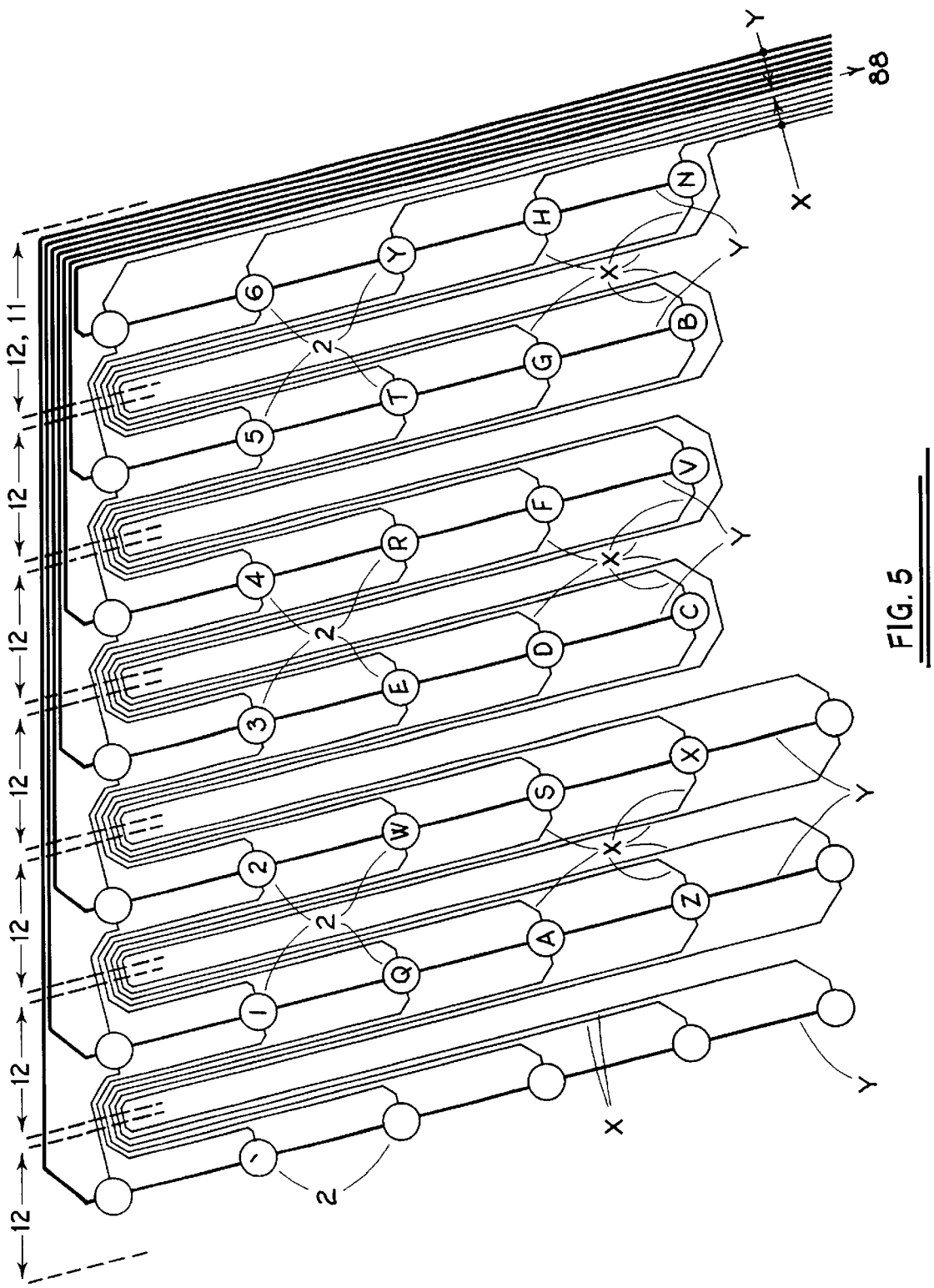
FIG. 5 is a microcircuitry diagram of essentially the left half of the keyboard: i.e. the spine bar (the bar that supports keys F6 6 Y H N) and the keys to its left. The microcircuitry map of the keys to the right of the spine bar is essentially a mirror image of the keys to the left.

Referring to FIG. 5 of the Drawings: This is a microcircuitry diagram of the left side of keyboard 1 including spinebar 11 (the microcircuitry on the right of keyboard 1 is essentially a mirror image of that on the left). In this top view keys 2 and busbars 12 are located somewhat as they would be on an actual keyboard 1; however, the alphanumeric keys are shown not as they actually look but as circles containing the character which each key represents, and the circles for the nonalphanumeric keys are left blank. Also, busbars 12 are shown in partial dotted lines, and spine bar 11 is shown as wider than the other busbars 12 so the larger number of conductors in this busbar may be clearly portrayed, even though in most embodiments spine bar 11 has the same width as the other busbars 12.

In this microcircuitry diagram, each microconductor or wire X conducts electronic data from a horizontal row of keys 2 to each busbar 12 to each adjacent busbar 12 to the spine bar 11 to XY decoder 88 inside computer body 20; and each microconductor or wire Y conducts electronic data from a near-vertical (i.e. \\\\\\\) row of keys 2 to each busbar 12 to each adjacent busbar 12 to spine bar 11 to XY decoder 88. This microcircuitry in whole or in part can have a variety of other configurations without any of them diverging from the nature of what has been described herein.

Referring to FIG. 6 of the Drawings: This includes two perspective views of a flexible flat ribbon 40, which in this embodiment conducts electronic data between two adjacent busbars 12 whether they are open or closed, wherein the ends of flexible flat ribbon 40 are attached to plugs 42 located beneath the back ends of adjacent busbars 12. FIG. 6-OPEN shows ribbon 40 in a somewhat flat configuration when adjacent busbars 12 are in open position whiles FIG. 6-CLOSED shows ribbon 40 in a looped configuration when adjacent busbars 12 are in closed position. Thus electronic data from the several keys 2 mounted on any busbar 12 is conducted through a series of flexible flat ribbons 40 from busbar to busbar toward spinebar 11 whether keyboard 1 is open or closed. Also shown in these views are braces 14 below busbars 12. This conductor's related assembly in whole or in part can have a variety of other configurations without any diverging from the nature of what has been described herein.

Referring to FIG. 7 of the Drawings: This includes two perspective views of a W-shaped flexible flat ribbon 44, which in this embodiment conducts electronic data between any two adjacent busbars 12 whether they are open or closed (this conductor can also be located between any two adjacent braces), wherein the ends of W-shaped flexible flat ribbon 44 are attached to plugs 42 located between adjacent side indents 12-IS in adjacent busbars 12. FIGS. 7-OPEN shows ribbon 40 extended between adjacent side indents 12-IS when adjacent busbars 12 are in open position while FIG. 7-CLOSED shows ribbon 40 compactly configured between indents 12-IS when adjacent busbars 12 are in closed position. These two views also show how the various folds in flexible flat ribbon 44 enable it to open and close flexibly while remaining in nearly the same plane that it expands and contracts. Such conductors can have numerous kinds of folds or pleats to achieve the same flexible conductance of which the one shown is only an example, and this conductor can have a variety of other configurations without any diverging from the nature of what has been described herein.

Figure 8:
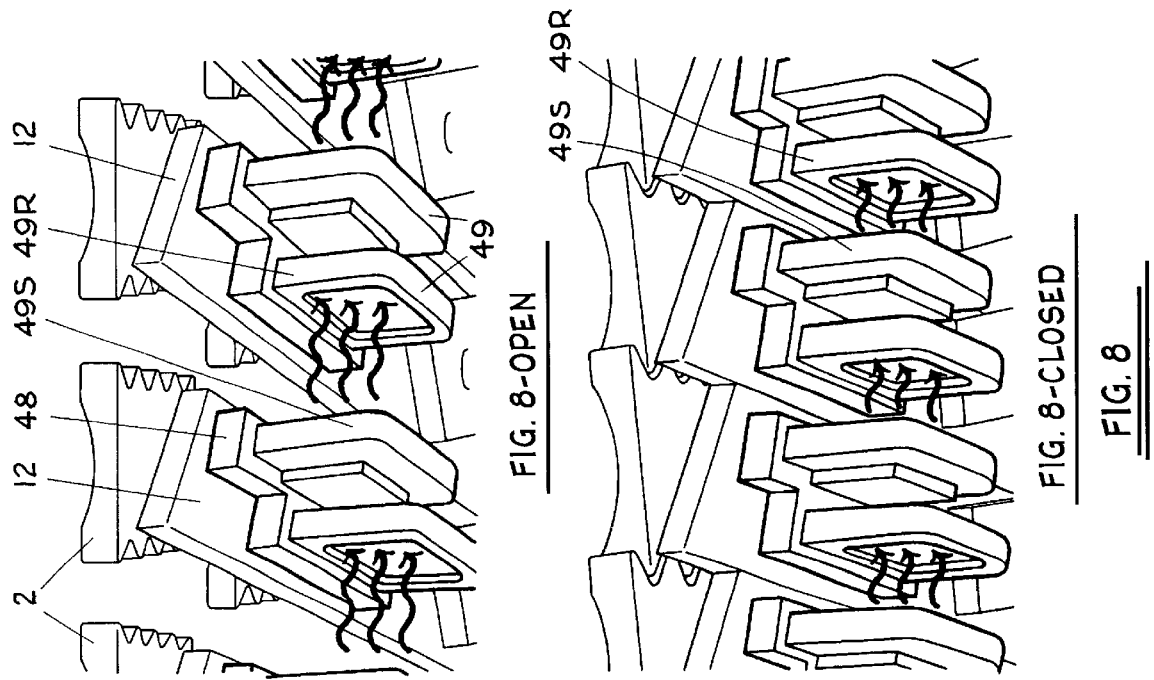
FIGS. 8-OPEN and 8-CLOSED show open and closed views of a wireless or infrared (IR) means of conducting electricity which in this particular embodiment is situated between two adjacent busbars in open and closed position.

Referring to FIG. 8 of the Drawings: This includes two perspective views 8-OPEN and 8-CLOSED of a wireless or infrared (IR) means of conducting electricity, which in this embodiment conducts electronic data between any two adjacent busbars 12 whether busbars 12 are open or closed, wherein said conductance proceeds from any one busbar 12 to a driver microchip 48 located beneath the end of busbar 12, from where chip 48 activates a contiguous infrared sender diode 49S that transmits electronic data through the air—i.e. wirelessly—to an infrared receiver diode 49R similarly mounted on adjacent busbar 12, from where the electronic data is conducted similarly from busbar to busbar toward spine bar 11. This infrared assembly can be located almost anywhere along busbars 12 or even braces 14, as long as sender photodiode 49S and receiver photodiode 49R face generally toward each other when they are in open or closed position. This infrared assembly can have a variety of other configurations without any diverging from the nature of what has been described herein.

Figure 9:
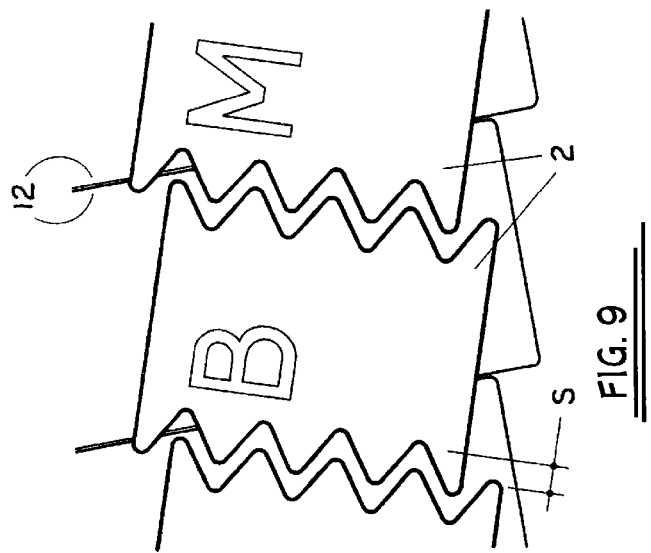
FIG. 9 is an enlarged top view of two adjacent busbars and the keys above that shows how the busbars' sides abut each other when the keyboard is closed in a manner that limits its minimum width and also maintains a slight space between the sides of any two adjacent keys.

Referring to FIG. 9 of the Drawings: This is a top view of part of keyboard 1 in closed position, wherein the adjacent sides of two busbars 12 abut each other and maintain a small space S between the narrower keys 2 above. Thus the widths of busbars 12 determine the minimum width of keyboard 1 when it is closed and keep the sides of any two adjacent keys 2 from touching each other which keeps a depressed key from activating another. These assemblies can have a variety of other configurations without any diverging from the nature of what has been described herein.

Referring to FIG. 10 of the Drawings: This includes two views of two adjacent braces 14 with integral hooks or latches 50 on their sides, which in this embodiment limit the maximum width of keyboard 1 when it is open. In FIG. 10-CLOSED the ends of hooks 50 are nested in indents 51 in the sides of adjacent braces 14 as keyboard 1 is closed; then as keyboard 1 opens, the ends of each pair of hooks 50 move toward each other, until in FIG. 10-OPEN their ends catch on each other to prevent keyboard 2 from opening any wider, and this establishes the 19 mm pitch of keys 2 when they are open. Such catching of said hooks 50 also eliminates a phenomenon described earlier in this Specification as "linkage-lag", wherein if hooks 50 or similar limiting device are not present, as keyboard 1 is opened its outermost keys 2 tend to open too wide before the innermost keys start to spread apart. FIG. 10-SEC is a section thro' hooks 50 in closed position wherein each adjacent hook 50 has a projecting face 52 that mates with an indented surface 53 in opposing hook 50 to ensure the hooks' planar alignment as they come together. This hooking mechanism can be on almost any part of braces 14, and it can have a variety of other configurations without any diverging from the nature of what has been described herein.

Referring to FIG. 11 of the Drawings: This includes four views of a series of sliding slotted stops 54 located on the underside of braces 14 which in this embodiment limit the maximum width of keyboard 1 when it is open. FIG. 11–54 is a perspective view of sliding slotted stop 54 which is made of a thin strong rustproof material, whose channel-like shape has an inner web 54W between two side flanges 54F, wherein one end of web 54W has an elongate hole 56 and the other end has a round hole 57 whose diameter is the same as the width of elongate hole 56. In FIG. 11-OPEN and 11-CLOSED, each hole 56 and 57 receives two connectors 55 that loosely fasten the ends of stop 54 to the undersides of two braces 14 so the connector in elongate hole 56 can slide freely back and forth as keyboard 1 opens and closes. Thus when each pair of connectors 55 in each sliding stop 54 are their maximum distance apart as in FIG. 11-OPEN, keyboard 1 can open no wider, and this establishes the standard 19 mm pitch of keys 2 when they are open. Sliding stops 54 also eliminate the above-described linkage-lag which tends to occur as keyboard 1 is opened if stops 54 or similar limiters are not present. Operation of the Disclosed Invention's working prototypes revealed that stops 54 did not need to be connected to every pair of adjacent braces to eliminate the above-described linkage-lag, that connection to every other brace was adequate. FIG. 11-SEC. is a section thro' keyboard 1, laterally flexible assembly 10, and sliding stops 54 that shows a shallow trench 58 in computer top 20T that provides riding room for sliding stops 54 as keyboard 1 opens and closes. The plurality of sliding slotted stops 54 can connect to braces 14 anywhere along their undersides, they can be connected in more than two rows, and they can have a variety of other configurations without any diverging from the nature of what has been described herein.

Referring to FIG. 12 of the Drawings: This includes four views of a spacebar handle mechanism 60, which in this embodiment either raises spacebar 62 to facilitate opening and closing of keyboard 1 or lowers spacebar 62 to clamp keyboard 1 securely in place when it is open or closed. Spacebar handle mechanism 60 includes an angular spacebar base 64 below spacebar 62 which contains an upper flange 64UF and lower flange 64LF, a double torsion spring 66 which has a looped stop in its center and fits into lower flange 64LF, a shaft 68 which fits into lower flange 64LF and holds spring 66 in place, a handle 70 whose back edge is located adjacent to spacebar 62 and whose front edge has a slightly projecting lever 70F, a handle base 74 which is located below handle 70 and has a deep notch 74N and downward-projecting catch 74C, two spacers 72 which fit between handle 70 and handle base 74 to form grooves between the sides of parts 70 and 74, a wirelike connector 69 with hooks on each end that joins handle base 74 to spacebar base 64, a somewhat box-like handle case 76 which contains a catch spring 78 and has two side flanges 76F that fit into two grooves between the sides of handle base 74 and handle base 76, and computer indent 20-1 which receives handle case 76 and other portions of spacebar handle mechanism 60.

FIG. 12-EXP is an exploded view of spacebar handle mechanism 60 which shows how it lifts or lowers adjacent spacebar 62 as follows: when one pulls lever 70F of handle 70 from the front of keyboard 1, this action pulls handle base 74 and connector 69 frontward which pulls frontward the edged portion of spacebar base 64 that lies between its upper and lower flanges 64UF and LF, which, because the base of lower flange 64LF is held in place by shaft 68, leverages the far end of upper flange 64UF and spacebar 62 upward. While handle base 74 is moving frontward its downward-projecting catch 74C rides over a hump in catch spring 78 below, depressing this spring, then after catch 74C has passed over this hump, spring 78 rises to prevent catch 74C from returning to its original position, wherein this stoppage keeps spacebar 62 in "up" or "lift" position. Next, by pushing lever 70F of handle 70 back toward keyboard 1 with slightly more force than was exerted during the earlier-described frontward action, downward-projecting catch 74C rides again over the hump in catch spring 78, whereupon double torsion spring 66 in lower flange 62LF forces spacebar 62 down with enough pressure to make spacebar 62 hold keyboard 1 securely in place. These movements are further clarified by FIG. 12-UP, a section thro' the spacebar handle assembly when spacebar 62 is up, FIG. 12-DOWN, a section thro' the spacebar handle assembly when spacebar 62 is down, and FIG. 12-SEC, a lateral section thro' the handle assembly when spacebar 62 is down. Although the operation of spacebar handle mechanism 60 has been described in considerable detail above, each portion of this assembly and the assembly as a whole can have a variety of other configurations without any diverging from the nature of what has been described herein.

Referring to FIG. 13 of the Drawings: This includes two sectional views of a spring/catch mechanism 82 beneath spacebar 62, FIG. 13-DOWN thro' their left halves when in down position, and FIG. 13-UP thro' their right halves when in up position. In this embodiment, spring/catch mechanism 82 beneath spacebar 62 moves this elongate key slightly upward to facilitate the opening and closing of keyboard 1. Mechanism 82 includes two upper catches 83 which descend from the underside of spacebar 62 on each side of XY decoder 88 (or other interior portion of computer 20) and which have faces 83U and 83L, two lower catches 84 which rise from computer body top 20T on each side of XY decoder 88 and which have faces 84U and 84L, and two springs 86 on each side of XY decoder 88 which apply a slight extensive force between the underside of spacebar 62 and computer top 20T.

Sectional view 13-DOWN shows spring/catch mechanism 82 and spacebar 62 above in "down" or normally operable position, wherein upper face 83U of upper catches 83 mates with lower face 84L of lower catch 84; and sectional view 14-UP shows spring/catch mechanism 82 and spacebar 62 in "up" position, wherein lower face 83L of upper catch 83 mates with upper face 84U of lower catch 84. Faces 83U, 83L, 84U, and 84L are angled so that only a slight pressure against the underside of spacebar 62 (i.e. the top front ends of busbars 12 pressing the overlapping edges of spacebar 62 upward as keyboard 1 is lifted slightly when it is opened or closed) makes the outer edges of catches 83 and 84 (which have slightly flexible shafts) slip past each other in a way that makes spacebar 62 move upward, but a similar pressure on top of spacebar 62 forces spacebar 62 back down to its operating position. The strength of springs 86 also urges this up-down action as desired. When spacebar 62 is in operating position, springs 86 also maintain a slight gap G between spacebar 62 and its lowermost position when it closes an electric circuit (not shown) during normal typing activity. Spring/catch mechanism 82 can have a variety of other configurations without any of them diverging from the nature of what has been described herein.

Referring to FIG. 14 of the Drawings: This includes four views of an outrigger 90 located under each corner of keyboard 1 to support the outermost portions of keyboard 1 when it is open. There are four outriggers 90, each of which has a substantially horizontal inner end 90-I that slides into an encasement 25 in computer body 20, a substantially vertical outer end 90-O under a corner of keyboard 1 that supports keyboard 1 when it is open, and a structurally appropriate cross-section (shown in this embodiment as an inverted T). Encasement 25 has a void 25V that envelopes outrigger 25's cross-section in a manner that supports inner end 90-I when only part of end 90-I remains in void 25V when keyboard 1 is open (wherein the innermost part of end 90-I is located at OP) and also allows inner end 90-I to slide snugly within the length of void 25V until virtually all of inner end 90-I is within void 25V when keyboard 1 is closed (wherein the innermost part of end 90-I is located at CL). A connector 92 fastens the top 90-I of each outrigger's outer end 90-O to the underside of laterally flexible assembly 10 in a way that supports a corner of keyboard 1 when it is open and allows outer end 90-O to rotate slightly about its vertical axis as keyboard 1 opens and closes. Also, the side of computer 20 contains an inset 126 that largely encloses outer end 90-O of outrigger 90 when keyboard 1 is closed. Sectional view 14-CLOSED shows outrigger 90 and its related parts when keyboard 1 is closed, sectional view 14-OPEN shows the same parts when keyboard is open, end view 14-END shows how outrigger 90 fits into inset 126 when keyboard 1 is closed, and section 14-SEC shows how inner end 90-I fits snugly and slidably in void 25V of encasement 25. In these views the means by which electricity is conducted from one busbar 12 to the next are omitted for clarity. Outrigger 90's shape and related assembly can have a variety of other configurations without any diverging from the nature of what has been described herein.

Referring to FIG. 15 of the Drawings: This includes three views of a leg 96 situated under each corner of keyboard 1 which in this embodiment supports the outer portions of keyboard 1 when it is open. Each of four legs 96 has a top 96T which is connected by connector 98 to laterally flexible assembly 10, a shaft 96S which structurally supports keyboard 1 when it is open and resists lateral sliding forces at its base as keyboard 1 is opened or closed, and a foot 96F that lies on the parent system's resting surface 21 and whose round underside rides over any rough areas in surface 21 as keyboard 1 opens or closes. Section 15-OPEN shows leg 96 and its related parts when keyboard 1 is open, section 15-CLOSED shows the same parts when keyboard is closed, and end view 15-END shows how leg 96 fits snugly and slidably into inset 26L of computer body 20 when keyboard 1 is closed. In these views the means by which electricity is conducted from one busbar 12 to the next are omitted for clarity. Leg 96's shape and related assembly can have a variety of other configurations without any diverging from the nature of what has been described herein.

Referring to FIG. 16 of the Drawings: This includes a top view 16A and three plan sections 16B, 16C, and 16D of a particular embodiment of key 2 and busbar 12 in which key 2 is in depressed or activated position. In all situations, mirror images of this embodiment are as valid as the ones shown.

FIG. 16A is a top view of key 2 and the portion of busbar 12 below that lies between two rows of keys 2. In this view, (1) the tips 6T and indents 6I in the two indented side profiles 6 of this embodiment of key 2 are round instead of being pointed as they appear in FIG. 1 of the Drawings, (2) the location of an adjacent key 2 when keyboard 1 is open is shown in dotted lines to the left of key 2 at 2-O and the location of an adjacent key 2 when keyboard 1 is closed is shown in dotted lines to the right of key 2 at 2-C, and (3) the small space between any two adjacent keys 2 when keyboard 1 is closed is denoted by the letter S.

The plan section of FIG. 16B is taken just above the top of busbar 12 when key 2 is in depressed or activated position. This view shows (1) the outline of the top or tactile surface 8 of key 2 in dotted lines, (2) left and right longitudinal key guides 102-L and 102-R and the adjacent outermost portions of key 2 located under the top of key 2, which lie below this section and thus appear as isolated sections, (3) left and right longitudinal busbar guides 112-L and 112-R on the tops of busbar 12 that align with guides 102-L and 102-R under key 2 when key 2 is depressed, (4) projections 114 located intermittently along the inside top edges of busbar 12 where they hold circuitry ribbon 130 in busbar 12 (the relationship between projections 12B and circuitry ribbon 130 is more visible in FIG. 18A), (5) a trough-like central area in busbar 12 from which rises busbar prongs 116 to engage key prongs 118 descending from the underside of key 2 to hold key 2 in place on busbar 12, (6) the snug confinement of two key prongs 118 by two key guides 120 that assure the smooth and accurate travel of key 2, (7) a centrally located cylindrical pendant 122 which (a) descends from key 2, (b) has a locus of electrical contacts 124 on its tip (not shown) that close an electrical circuit between key 2 and the parent system's circuitry 39 when key 2 is depressed, and (c) is surrounded by a small coil spring, hollow rubber grommet, or similar elastic member 127 that keeps key 2 poised in unactivated position, and (8) buttress 128 between two longitudinally adjacent key guides 120 which laterally strengthens guides 120 and forms an inverted base for any connectors 16 that descend from this portion of busbar 12 to connect busbar 12 to brace 14, and (9) a peak 128P on buttress 128 which forms two sloping sides 128S that urge the shedding of any dust and other microdebris that may settle in this part of keyboard 1.

The plan section of FIG. 16C is taken at the level of a locus of open circuitry terminals 132 situated beneath pendant 122 (shown in dotted lines) and is essentially a "floor plan" of the trough-like central area of busbar 12. This view shows (1) the outline of top or tactile surface 8 of key 2 in dotted lines, (2) the location of elastic member 127 around open circuitry terminals 132, (3) open circuitry terminals 132 situated between two circuitry ribbons 130 in the sides 12S of busbar 12, (4) the engaging of key prongs 118 and busbar prongs 116 as key 2 moves up and down, (5) the snug confinement of key prongs 118 by key guides 120 as key 2 moves up and down, and (6) the backs of key guides 120 laterally supported by buttresses 128 as key 2 moves up and down.

The plan section of FIG. 16D is taken near the bottom of busbar 12 and shows (1) the outline of tactile surface 8 of key 2 in dotted lines, (2) cavities 134 located below intermittent projections 114, and (3) cavities 135 located below key prongs 118.

Referring to FIG. 17 of the Drawings: In these three exploded perspective views of the key-to-busbar assembly shown in FIG. 16, FIG. 17A is a worm's eye view of key 2 and FIGS. 17B and 17C are bird's eye views of generally unitary portions of printed circuitry ribbon 130 and busbar 12, wherein the anatomy of these three components are portrayed more comprehensively than can be shown in top or side views alone. In these views elastic member 127 that fits between each key and busbar 12 below to keep key poised in its normal position when it is not being activated is not shown for clarity.

Figure 18:
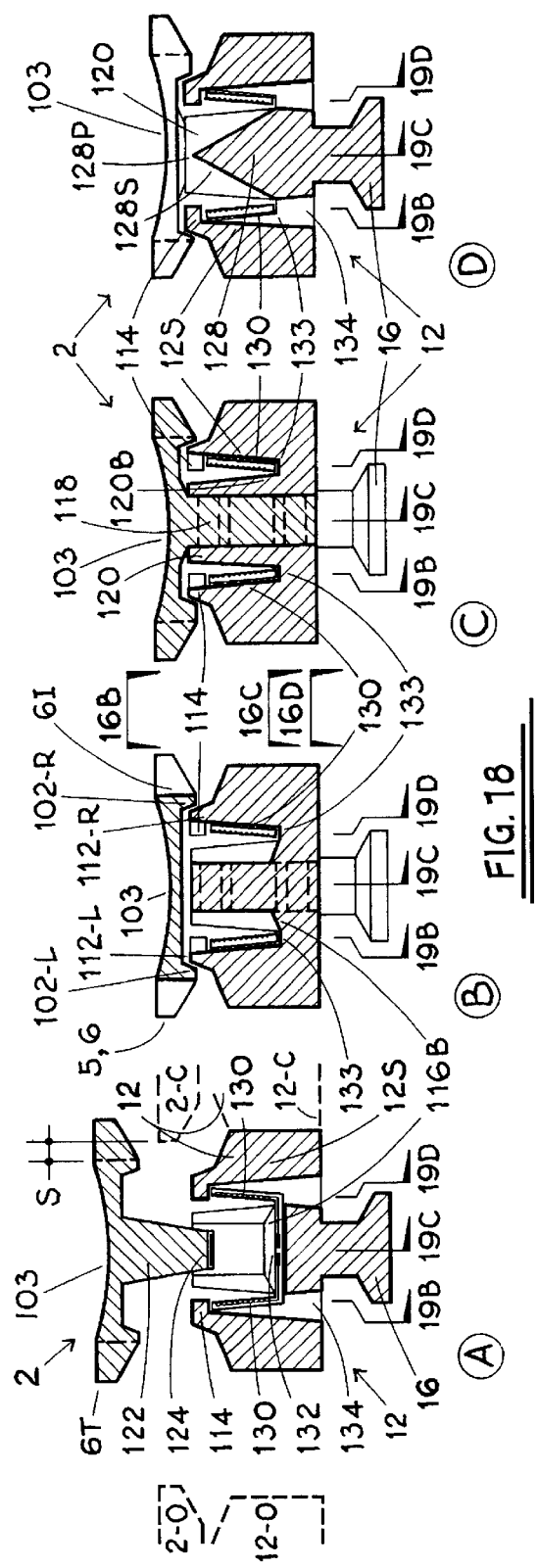

Referring to FIG. 18 of the Drawings: In these four lateral sections thro' the same key-to-busbar assembly shown in FIGS. 16 and 17, the sections are taken as described below. In these sections a number of dotted lines which show hidden portions of this assembly are omitted for clarity.

Section 18A is taken thro' pendant 122 under key 2 and open circuitry terminals 132 in the trough-like central portion of busbar 12 when key 2 is poised in unactivated position. This view shows (1) the maximum width of key 2 thro' its projecting tips 6T in its two indented side profiles 6, (2) the concavity 103 in the top of key 2, (3) the locations of adjacent key 2-O and busbar 12-O in dotted lines to the left of key 2 when keyboard 1 is in open position and the locations of adjacent key 2-C and busbar 12-C in dotted lines to the right of key 2 when keyboard 1 is closed position, (4) the slight space S between the interlocking profiles of two adjacent keys 2 created by the abutting sides of adjacent busbars 12, (5) projections 114 located intermittently along the upper edges of each printed circuitry ribbon 130 to hold each ribbon 130 in busbar 12, (6) a locus of electrical contacts 124 on the tip of pendant 122 located above a locus of open circuitry terminals 132 extending from two printed circuitry ribbons 130 on each side so that when key 2 is depressed, electrical contacts 124 close one or more circuits with open circuitry terminals 132 between key 2 and the parent system's circuitry 39, (7) cavity 134 which enables the underside of each projection 114 to be formed by an upward portion of the plastic-injection mold that forms busbar 12, and (8) connector 16 which may be located on the underside of this portion of busbar 12 to join busbar 12 to brace 14.

Section 18B is taken between the engaging surfaces of busbar prong 116 rising from the inner area of busbar 12 and key prong 118 descending from key 2 when key 2 is in depressed or activated position. This view shows (1) the minimum width of key 2 at indents 61 in its indented side profiles 6, (2) concavity 103 in the top of key 2, (3) the aligning of left and right longitudinal busbar guides 112-L and 112-R on the top portions of busbar 12 with longitudinal guides 102-L and 102-R under key 2 for purposes of guiding key 2 when it is depressed, (4) two slots 133 which receive and hold in place the bottoms of printed circuitry ribbon 130 between the widened base 116B of busbar prong 116 and the sides 125 of busbar 12, and (5) projections 114 located intermittently along the inside top edges of busbar 12 where they hold in place the tops of printed circuitry ribbon 130.

Section 18C is taken thro' key prong 118 descending from the underside of key 2 and key guide 120 rising from busbar 12 when key 2 is in depressed or activated position. This view shows (1) the top portion of key 2 moved slightly off-center to the left so the relation of this key (i.e. the "E" key and the others in its row) to others in its column may be the same as on a standard keyboard, (2) concavity 103 in the top of key 2, (3) key guide 120 snugly confining key prong 118 to assure the smooth and accurate travel of key 2, (4) slots 133 which receive and hold in place the bottoms of printed circuitry ribbon 130 between the widened base 120B of key guide 120 and the sides 12S of busbar 12, in and (5) projections 114 located intermittently along the tops of busbar 12 where they hold in place the tops of printed circuitry ribbon 130.

Section 18D is taken thro' the part of busbar 12 that includes buttress 128 when key 2 is in depressed or activated position. This view shows (1) an end view of the upper portion of key 2 which includes concavity 103 in the top of key 2, (2) the top portion of key 2 moved slightly off-center to the right so the relation of this key (i.e. the "D" key and the others in its row) to others in its column may be the same as on a standard keyboard, (3) key guide 120 below key 2 and above an end of buttress 128, (4) peak 128P of buttress 128 which forms two sloping sides 128S that urge any dust or microdebris settling on or near this area of keyboard 1 to slide through cavities 134 below projections 114, and (5) a connector 16 which may be located on the underside of this portion of busbar 12 to join busbar 12 to brace 14.

Figure 19:
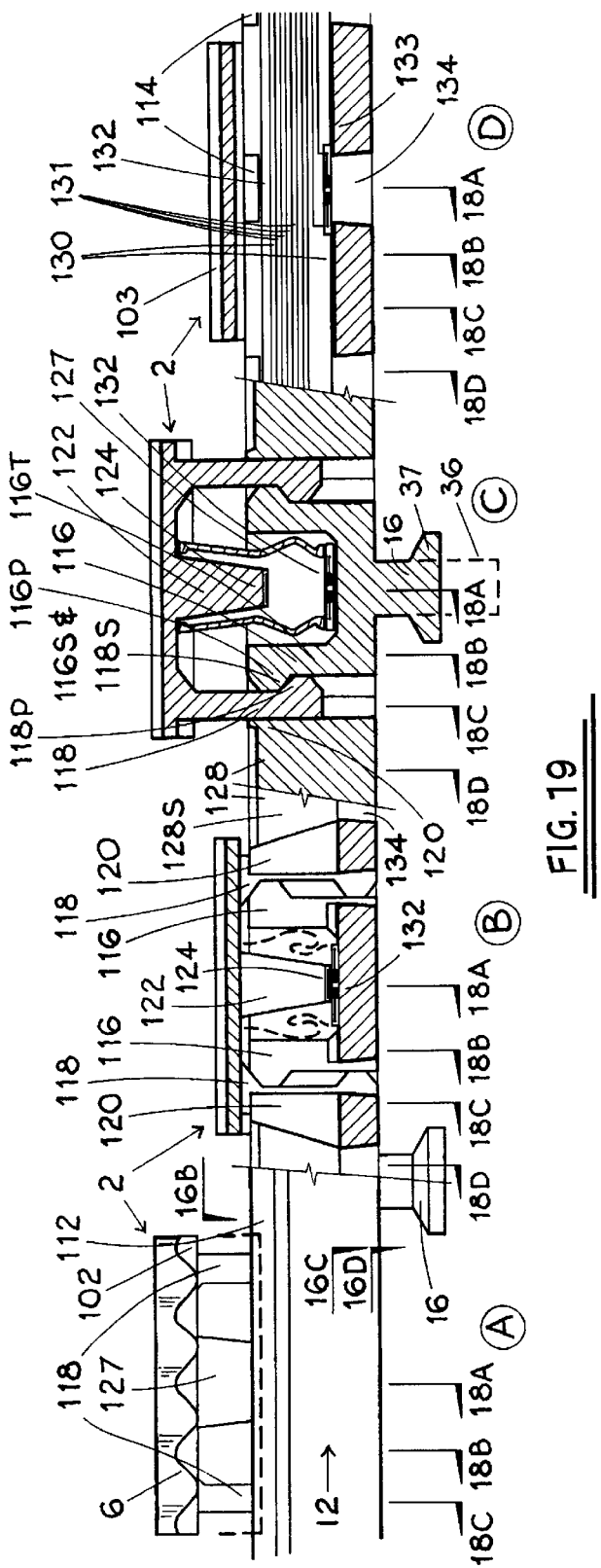

Referring to FIG. 19 of the Drawings: This includes a side elevation 19A and three longitudinal sections 19B, 19C, and 19D thro' the same key-to-busbar assembly shown in FIGS. 16, 17, and 18, wherein the four views are spaced at generally the same intervals as are the rows of keys 2 on keyboard 1 to indicate the proper front-to-back spacing between these rows. These views are taken as follows:

Section 19A is a side elevation of key 2 and busbar 12 when key 2 is poised in unactivated position, and it shows (1) the indented side profile 6 of key 2 and its nearest longitudinal guide 102 below, (2) the upper portions of the sides of key prongs 118 and elastic member 127 beneath the top of key 2, (3) longitudinal busbar guide 112 on top of busbar 12, and (4) connector 16 which may be located beneath the area of buttress 128 to join busbar 12 to brace 14.

Section 19B is taken thro' the nearest portion of the trough-like central area of busbar 12 when key 2 is in depressed or activated position. This view shows (1) the upper portion of key 2, (2) a side view of pendant 122 and a locus of electrical contacts 124 on its tip mating with a locus of open circuitry terminals 132 to close one or more circuits between key 2 and the parent system's circuitry 39 when key 2 is depressed, wherein the outer surface of elastic member 127 is shown in dotted lines for clarity, (3) a side view of key prongs 118 descending from the underside of key 2 and busbar prongs 116 rising from busbar 12, (4) key guide 120 snugly confining key prong 118 to assure the smooth and accurate travel of key 2, and (5) sloping side 128S of buttress 128 which urges any dust or microdebris settling on or near this part of busbar 12 to slide through cavity 134 and away from busbar 12.

Section 19C is taken thro' the center of busbar 12 when key 2 is poised in unactivated position. This view shows (1) the upper portion of key 2, (2) a locus of electrical contacts 124 on the tip of pendant 122 situated above a locus of open circuitry terminals 132 so that when key 2 is depressed, electrical contacts 124 descend and mate with open circuitry terminal 132 to close one or more circuits between key 2 and the parent system's circuitry 39, (3) the full height of elastic member 127 when key 2 is poised in unactivated position, (4) busbar prongs 116 engaging key prongs 118 when key 2 is in unactivated position, wherein two projections 116P and 118P on the ends of prongs 118 and 116 form a catch to keep key 2 from moving further upward when in unactivated position and allows key 2 to be removed for purposes of servicing it and the busbar area below by a forceful upward leverage against the key's underside, wherein sloping surface 118S on projection 118P of key prong 118 pushes against a mating sloping surface 116S on projection 116P of busbar prong 116 and thus deflects busbar prong 116 enough to allow projection 118P to ride past projection 116P, and (5) connector 16 which may be located on the underside of this portion of busbar 12 to join busbar 12 to brace 14. In this embodiment there are two structurally optimal locations along the underside of busbar 12 for connectors 16: under the area of open circuitry terminals 132 and under buttress 128. In this embodiment connector 16 is injection-molded integrally with busbar 12 and has a cylindrical shaft 36 (shown in dotted lines) which extends from under busbar 12, then shaft 36 is inserted through a hole in brace 14 and its end is heat-softened to create a flange or boss 37 that fills a mating countersunk void in brace 14 in a manner that enables brace 14 to rotate snugly around connector 16. However, in other equally valid embodiments connector 16 could be a separate screw or rivet fastened to the underside of busbar 12.

Section 19D is taken thro' the furthest portion of the trough-like central area of busbar 12 when key 2 is in depressed or activated position. This view shows (1) the furthest portion of key 2 above the top of busbar 12, (2) concavity 103 in the top of key 2, (3) intermittent projections 114 along the tops of printed circuitry ribbon 130 and slots 133 along the bottom of ribbon 130, where projections 114 and slots 133 hold ribbon 130 in busbar 12, and (4) the location of cavities 134 below intermittent projections 114 which urge any dust or microdebris settling in or near the area above to fall away from busbar 12 and enable the portion of the plastic-injection mold of busbar 12 that forms the underside of projections 114 to retract when said mold is split apart.

Referring to FIG. 20 of the Drawings: This includes a top view 20A and three plan sections 20B, 20C, and 20D of a second embodiment of the Invention's key-to-busbar assembly. This second embodiment is especially relevant because it evinces the same principles of functionality in a much different way than does the embodiment of FIGS. 16 to 19. For example, the prongs, guides, and pendant of key 2 are all pronouncedly off center; the prongs, guides, contacts, connectors, and cross-section of busbar 12 are also pronouncedly off-center; prongs 116 are situated on a much different base; the meeting of electrical contacts 124 and open circuitry terminals 132 occurs not at the base of key 2 but beneath one of its sides; and printed circuitry ribbon 130 is in one piece instead of two halves and is located on the top of one side of busbar 12 instead of in a central depression. Indeed, the great difference between this "side-saddle" embodiment of FIGS. 20 to 23 and the "symmetrical" embodiment of FIGS. 16 to 19 indicates the wide range of variety that embodiments of this key-to-busbar assembly as well as the Invention as a whole can have. Also, mirror images of this embodiment are as valid as the ones shown.

FIG. 20A is a top view of key 2 and the portion of busbar 12 below that lies between two rows of keys 2. This view shows (1) the position of an adjacent key 2 when keyboard 1 is open in dotted lines to the left of key 2 at 2-O and the position of an adjacent key 2 when keyboard 1 is closed in dotted lines to the right of key 2 at 2-C, (2) a locus of electrical contacts 124 in dotted lines under the top of key 2, and (3) a small space S between two adjacent keys 2 when keyboard 1 is closed.

The plan section of FIG. 20B is taken just above the top of busbar 12 when key 2 is poised in unactivated position. This view shows (1) the top of key 2 above outlined in dotted lines, (2) a top view of busbar 12, (3) two key prongs 118 and integral fins 121 descending from key 2 and which are snugly confined by vertical guide surfaces 136V on the ends of two prong flanges 136, surfaces 12V on busbar 12, and surfaces 128V on two buttresses 128 to assure the smooth and accurate travel of key 2, (4) printed circuitry ribbon 130 and open circuitry terminals 132 on busbar 12 below electrical contacts 124 (not shown) under the side of key 2, (5) a substantially cylindrical post 140 rising from shelf 138 that extends from the side of busbar 12, wherein post 140 is circumferenced by a coil spring, hollow grommet, or similar elastic member 127 which returns key 2 to its normal position after it has been depressed, (6) two round surfaces 141 which partly enclose elastic member 127 to minimize the area occupied by member 127 while still allowing member 127 to flex up and down freely, (7) a substantially longitudinal prong flange 136 which rises from shelf 138 and from whose ends extend busbar prongs 116 that engage two key prongs 118 descending from the underside of key 2 to hold key 2 in place on busbar 12, and (8) buttresses 128 between adjacent key prongs 118 of two longitudinally adjacent keys 2 where they add strengthen busbar 12.

The section of FIG. 20C is taken thro' post 140 in busbar 12 and is essentially a "floor plan" of the area that supports elastic member 127. This view shows (1) the top of key 2 above in dotted lines, (2) key prongs 118 and integral fins 121 snugly confined by vertical guide surfaces 136V on prong flanges 136, surfaces 12V on busbar 12, and surfaces 128V on buttresses 128 to assure the smooth and accurate travel of key 2, (3) the engaging of key prongs 118 descending from key 2 by prong flanges 136 extending from busbar prongs 116 rising from shelf 138 to hold key 2 in place on busbar 12, (4) post 140 rising from shelf 138 and circumferenced by elastic member 127 which returns key 2 to its normal or unactivated position after it has been depressed, (5) two round surfaces 141 which partly enclose elastic member 127 to minimize the area occupied by member 127 while allowing it to flex up and down freely, and (6) buttresses 128 between adjacent key prongs 118 of two longitudinally adjacent keys 2.

The plan section of FIG. 20D is taken just above the bottom of busbar 12, and it shows (1) the top of key 2 above in dotted lines, (2) key prongs 118 and integral fins 121 snugly confined by vertical guide surfaces 136V on two prong flanges 136, surfaces 12V on busbar 12, and surfaces 128V on buttresses 128 to assure the smooth and accurate travel of key 2, (3) the outline of shelf 138 and prong flange 136, and (4) a cavity 142 below buttress 128 which lightens this part of busbar 2 in a way that slightly lowers its cost and weight without appreciably reducing its strength.

Referring to FIG. 21 of the Drawings: This includes two exploded perspective views of the key-to-busbar assembly shown in FIG. 20. FIG. 21A is a worm's eye view of key 2 and FIG. 21B is a bird's eye view of a generally unitary portion of printed circuitry ribbon 130 and busbar 12, wherein the anatomy of these components are portrayed more comprehensively than in top or side views alone. In these views elastic member 127 which fits between each key and the busbar below and keeps the key poised in unactivated position is not shown for clarity.

Figure 22:
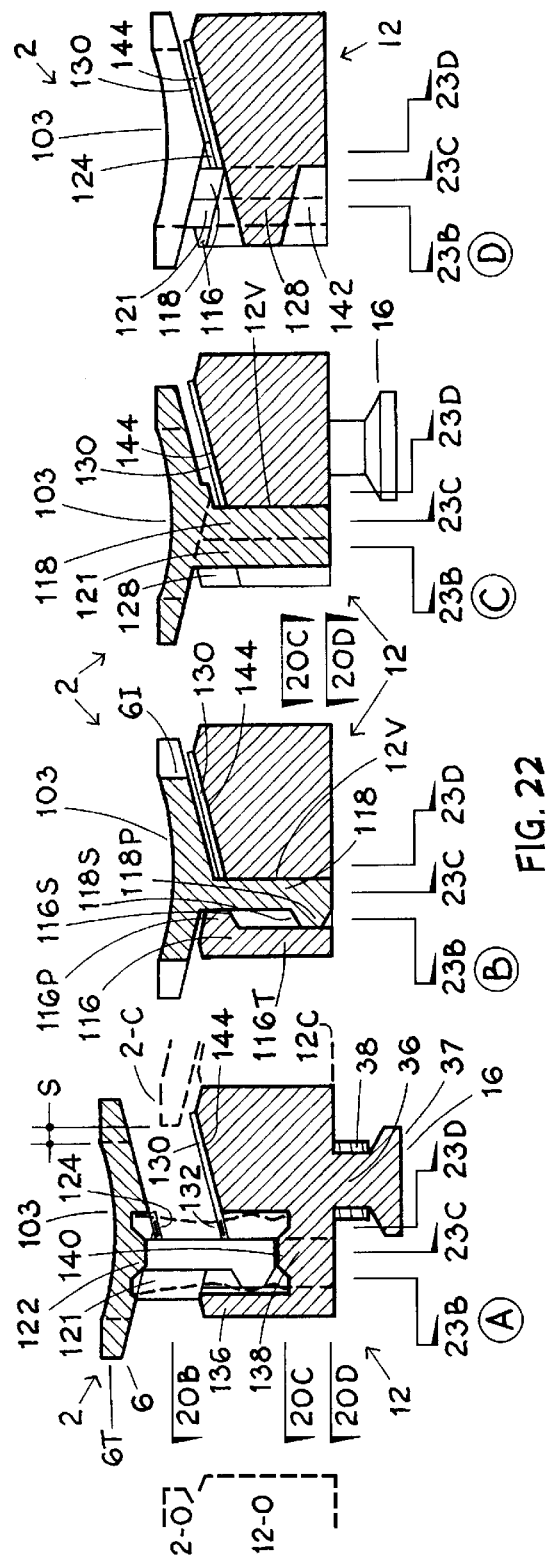

Referring to FIG. 22 of the Drawings: These are four lateral sections thro' the same key-to-busbar assembly shown in FIGS. 20 and 21, and are taken as described below. In these sections a number of dotted lines which show hidden portions of this assembly are omitted for clarity.

Section 22A is taken thro' the central portion of key 2 and the part of busbar 12 below when key 2 is poised in unactivated position. This view shows (1) the maximum width of key 2 through the projecting tips 6T in its indented side profiles 6, (2) concavity 103 in the top of key 2, (3) the location of adjacent key 2-O and busbar 12-O in dotted lines to the left of key 2 when keyboard 1 is in open position and the location of adjacent key 2-C and busbar 12-C in dotted lines to the right of key 2 when keyboard 1 is closed position, (4) the slight space S between two adjacent keys 2 created by the abutting sides of adjacent busbars 12 when keyboard 1 is closed, (5) a locus of electrical contacts 124 situated beneath one side of key 2 and above a locus of open circuitry terminals 132 in printed circuitry ribbon 130 on busbar 12 so that when key 2 is depressed, electrical contacts 124 descend and mate with open circuitry terminals 132 to close one or more electrical circuits between key 2 and the parent system's circuitry 39, (6) adhesive 144 between circuitry ribbon 130 and busbar 12, (7) pendant 122 which descends from key 2 and aligns with post 140 rising from shelf 138 to hold elastic member 126 in place, (8) the structurally integral relation between busbar 12, shelf 138, and prong flange 136, (9) connector 16 which in this embodiment may be located anywhere along the underside of busbar 12, and (9) a metal bushing 38 around shaft 36 of connector 16 between its flange or boss 37 and the underside of busbar 12 which in this embodiment reduces the wear that possibly tens of thousands of rotation cycles could inflict on shaft 36 during its rated life if it were made of plastic, wherein one method of fitting shaft 36 onto connector 16 is to insert the molded staking of connector 16 through bushing 38 before fitting connector 16 into its brace and heat-softening its end to create boss 37.

Section 22B is taken thro' key 2 when it is in depressed or activated position and the portion of busbar 12 that includes busbar prong 116 engaging key prong 118 descending from key 2. This view shows (1) the minimum width of key 2 thro' indents 61 in its indented side profiles 6, (2) concavity 103 in the top of key 2, (3) the manner in which the projections 116P and 118P form a catch to keep key 2 from moving further upward when it is poised in unactivated position and allows key 2 to be removed for purposes of servicing it and the keyboard area below by a forceful upward leverage against the key's underside, wherein a sloping surface 118S on projection 118P of key prong 118 pushes against a mating sloping surface 116S on projection 116P of busbar prong 116 and thus deflects busbar prong 116 enough to allow projection 118P to ride past projection 116P, (4) the location of printed circuitry ribbon 130 attached to busbar 12 with adhesive 144, and (5) key guide surface 12V of busbar 12 snugly confining key prong 118 to assure the smooth and accurate travel of key 2.

Section 22C is taken thro' key prong 118 and integral fins 121 of key 2 and the adjacent portion of busbar 12 when key 2 is in depressed or activated position. This view shows (1) the top of key 2 moved off-center to the left so the relation of this key (i.e. the "E" key and the others in its row) to others in its column may be the same as on a standard keyboard, (2) concavity 103 in the top of key 2, (3) the location of printed circuitry ribbon 130 attached to the top of busbar 12 with adhesive 144, (4) the snug confinement of key prong 118 by key guide surface 12V of busbar 12 which assures the smooth and accurate travel of key 2, (5) the outermost portion of buttress 128 projecting beyond fin 121 of key 2, and (6) connector 16 which in this embodiment may be located anywhere along the underside of busbar 12.

Section 22D is taken thro' the portion of busbar 12 that includes buttress 128 when key 2 is in depressed or activated position. This view shows (1) an end view of the exposed upper portion of key 2 which includes concavity 103 in its top, (2) the top portion of key 2 moved off-center to the right so the relation of this key (i.e. the "D" key and the others in its row) to others in its column may be the same as on a standard keyboard, (3) the location of printed circuitry ribbon 130 attached to the top of busbar 12 with adhesive 144, (4) the contiguously sloping tops of busbar 12 and buttress 128 which urge the shedding of any dust or microdebris which may settle in this vicinity of busbar 12, and (5) cavity 142 beneath buttress 128.

Figure 23:
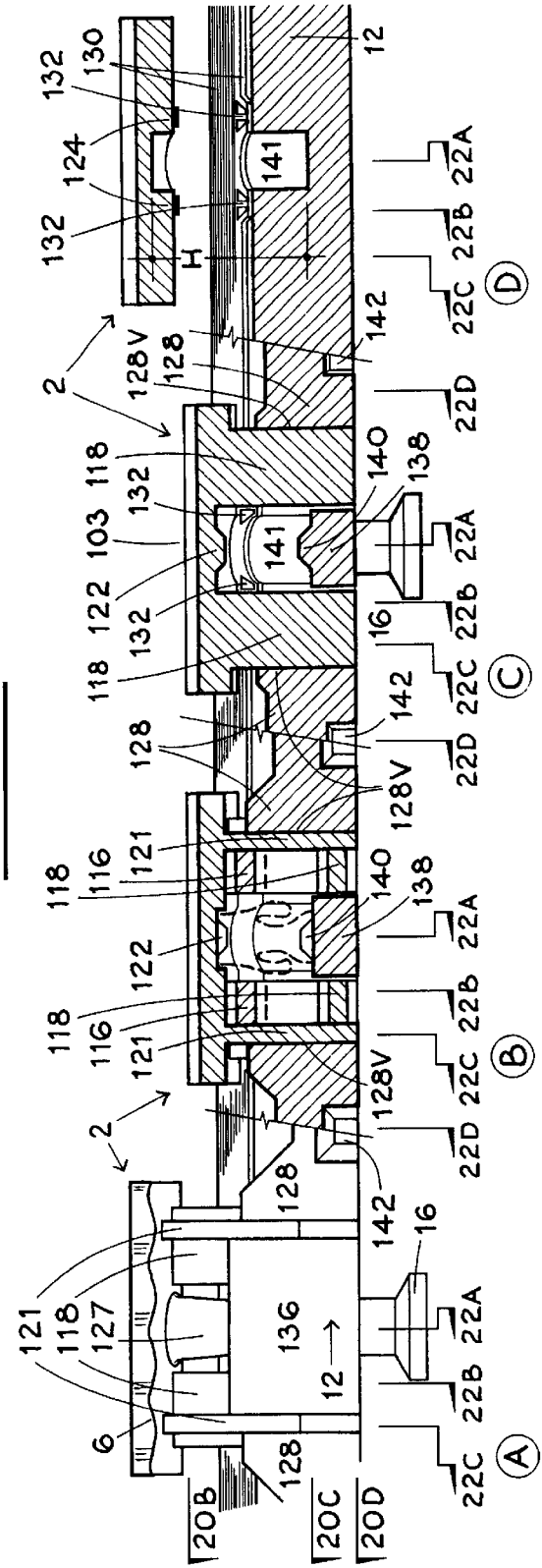

Referring to FIG. 23 of the Drawings: This includes a side elevation 23A and three longitudinal sections 23B, 23C, and 23D thro' the same key-to-busbar assembly shown in FIGS. 20, 21, and 22, wherein the four views are spaced at generally the same intervals as the rows of keys 2 on keyboard 1 to indicate the proper front-to-back spacing between said rows of keys 2. These views are taken as follows:

FIG. 23A is a side elevation of key 2 when it poised in unactivated position and a generally unitary portion of busbar 12 below. This view shows (1) the indented side profile 6 of key 2, (2) the upper portions of key prong 118, integral fins 121, and elastic member 127 beneath the top of key 2, (3) the outer face of prong flange 136, (4) the outer corners of buttresses 128 which snugly confine the outer portions of key guides 118, (5) cavity 142 beneath buttress 128, and (6) a connector 16 which in this embodiment may be located anywhere under busbar 12 to join busbar 12 to brace 14.

Section 23B is taken thro' integral fin 121 of key 2 and busbar prongs 116 of busbar 12 when key 2 is in depressed or activated position. This view shows (1) the alignment of busbar prongs 116 with key prongs 118 in their longitudinal dimensions, (2) the snug confinement of key prongs 118 by key guide surfaces 128V on buttresses 128 which assures the smooth and accurate travel of key 2, (3) the location of pendant 122 on the underside of key 2 above post 140 rising from shelf 138 on busbar 12, (4) the location of elastic member 127 between key 2 and shelf 138, wherein only the outline of member 127 in depressed position is shown in dotted lines for clarity, and (5) buttresses 128 and cavities 142 below.

Section 23C is taken thro' the center of pendant 122 descending from key 2 and post 140 rising from shelf 138 of busbar 12 when key 2 is in depressed or activated position. This view shows (1) the upper portion of key 2 which includes concavity 103 in its top, (2) the chamber that houses elastic member 127 when it is in depressed position wherein member 127 has been removed for clarity, (3) the inner parts of a locus of open circuitry terminals 132 above rounded surface 141 and between key prongs 118, (4) the longitudinal width of key prongs 118 descending from key 2, (5) the snug confinement of key prongs 118 by key guide surfaces 128V on buttresses 128 which assures the smooth and accurate travel of key 2, (5) the location of buttresses 128 between adjacent rows of keys 2 and cavities 142 below, and (6) connector 16 beneath shelf 138 which in this embodiment may be anywhere on the underside of busbar 12.

Section 23D is taken thro' the portion of busbar 12 that lies between post 140 and rounded surface 141 when key 2 is in inactivated position. This view shows (1) the upper portion of key 2 appearing as an isolated section beyond the section cut, (2) a locus of electrical contacts 124 under key 2 above a locus of open circuitry terminals 132 on busbar 12, wherein when key 2 is depressed, electrical contacts 124 descend and mate with open circuitry terminals 132 to close one or more circuits between key 2 and the parent system's circuitry 39, (3) a side view of a generally unitary portion of printed circuitry ribbon 130 with the locus of open circuitry terminals 132 along its lower edge, (4) rounded surface 141 below the locus of open circuitry terminals 132, (5) the full height H of the chamber that houses elastic member 127 when key 2 is poised in unactivated position, and (6) the most solid mass of busbar 12.

Figure 24:
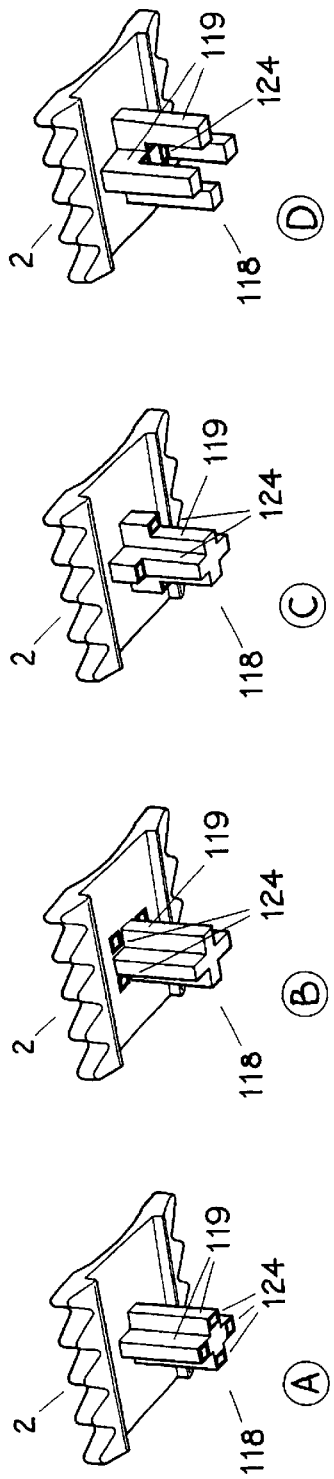

Referring to FIG. 24 of the Drawings: This includes worm's eye views of four embodiments of key prong 118 that descend from key 2. Each key prong 118 has four fins 119; but in FIG. 24A fins 119 are integrally connected and uniformly wide from top to bottom and have a locus of electrical contacts 124 on their tips; while in FIG. 24B fins 119 are as in FIG. 24A but electrical contacts 124 are near their bases on the underside of key 2; then in FIG. 24C fins 119 are integrally connected but have wider projections 150 near their tops and electrical contacts 124 are on projections 150; and in FIG. 24D fins 119 are integrally connected only near their tops and electrical contacts 124 are inside their separate lengths near their tops. Any other embodiments of key prongs 118, projections 119, and electrical contacts 124 that have other combinations of connectivity and projections are as valid as the embodiments shown.

Figure 25:
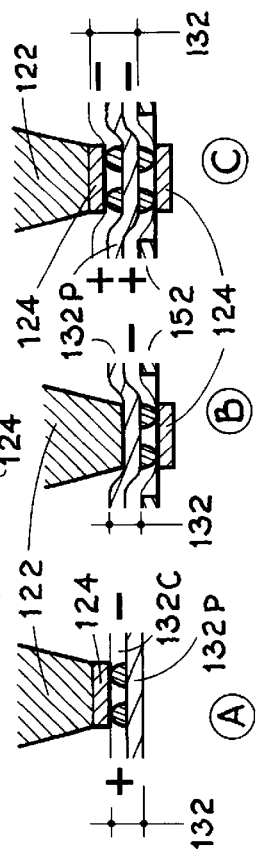

Referring to FIG. 25 of the Drawings: This shows two embodiments of two pair of electrical contacts 124 mounted on pendant 122 descending from key 2 so that each opposing pair of contacts 124 can be connected to each other without contacting the other pair. For example, in FIGS. 25A and 25B, contacts 124-X$_1$ and 124-X$_2$ are connected to each other while contacts 124-Y$_1$ and 124-Y$_2$ are connected to each other but none of the "X" contacts touch any of the "Y" contacts. Any other embodiments of contacts 124 that have a similar XX/YY connectivity and no XY nonconnectivity are as valid as the ones shown.

Figure 26:
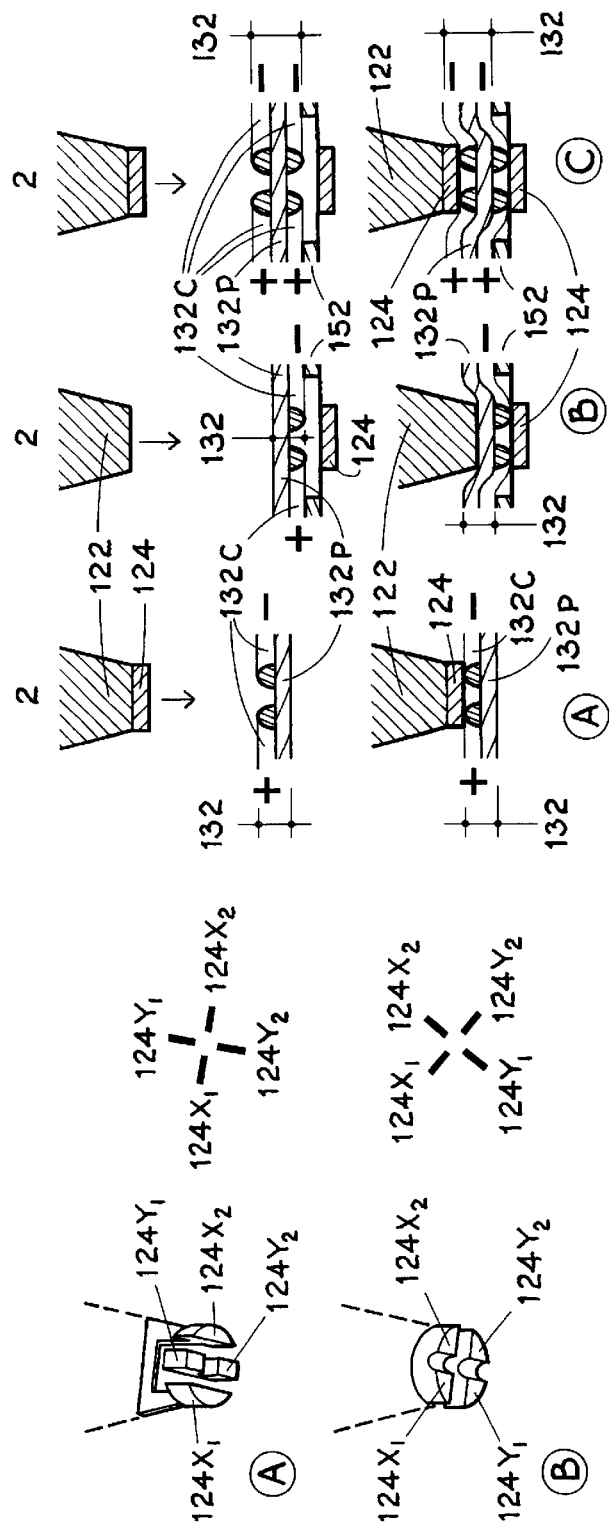

Referring to FIG. 26 of the Drawings: This shows three means of printing open circuits 132C on a thin sheet 132P of a flexible nonconductive material such as acrylic plastic. In FIG. 26A, open circuit 132C is on the side of sheet 132P facing electrical contacts 124 on the tip of pendant 122 descending from key 2 so that when key 2 is depressed, electrical contacts 124 press against sheet 132P which closes circuit 132C. In FIG. 26B, open circuit 132C is printed on the for side of sheet 132P from pendant 122 and electrical contacts 124 are also on the far side of sheet 132P, wherein circuits 132C and electrical contacts 124 are kept from touching electrical contact 124 by spacers 152 when key 2 is poised in unactivated position. Then when key 2 is depressed, pendant 122 presses sheet 132P and circuit 132C on its far side into electrical contact 124 which closes circuit 132C. FIG. 26C is FIGS. 26A and 26B combined, wherein open circuits 132C are printed on both sides of plastic sheet 132P; then when key 2 is depressed both circuits are closed as described in FIGS. 26A and 26B.

Figure 27:
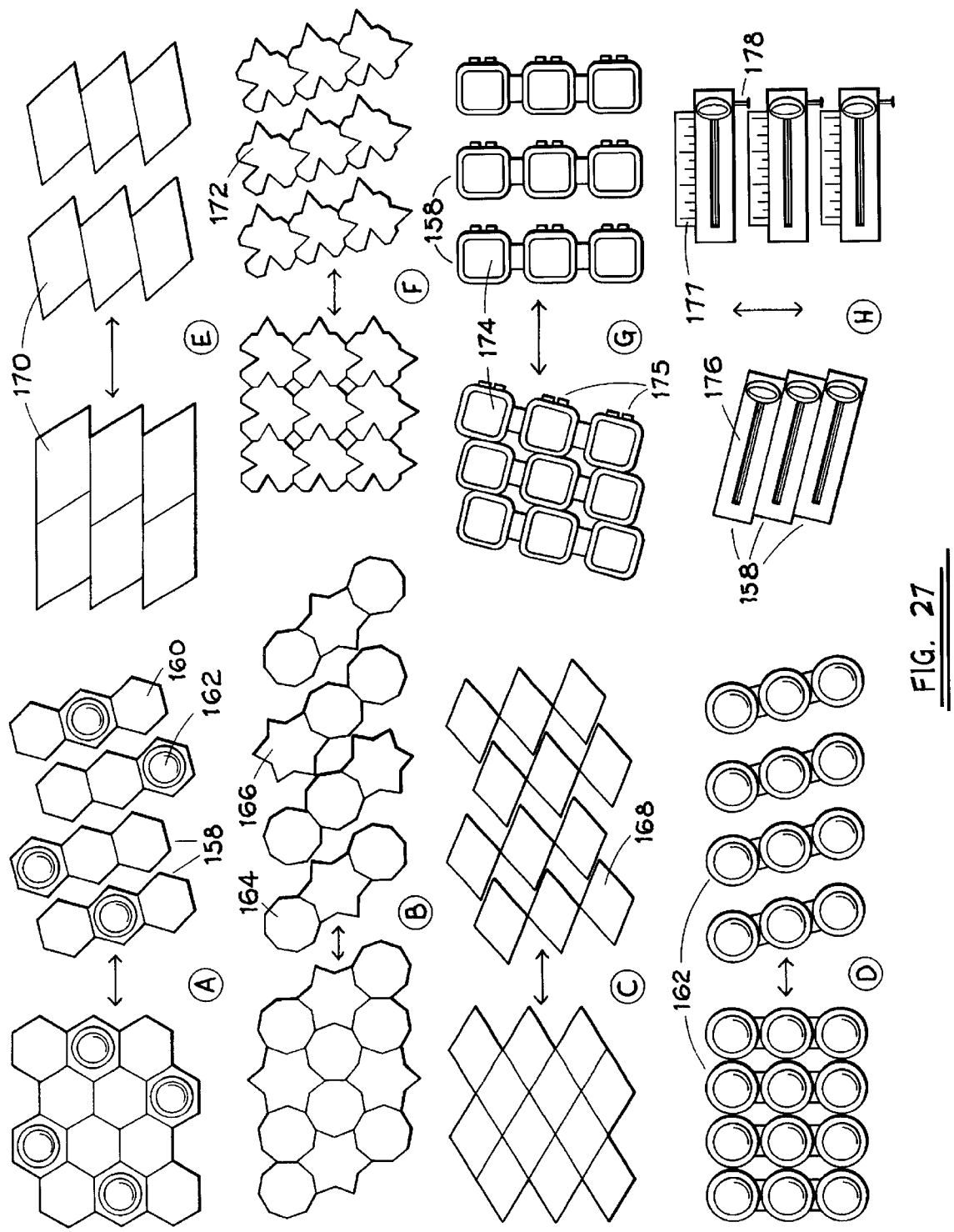

Referring to FIG. 27 of the Drawings: This includes FIGS. 27A to 27H which indicate the great variety of input/output activators that can be utilized in the Disclosed Invention. In each figure the portrayed activators are arranged in three or four columns 158 which are shown in closed and open positions.

FIG. 27A is a tiled plane of hexagonal activators 160 and indicator lights 162 (a tiled plane is a substantially planar arrangement of one or more repeated polygons of uniform size wherein the plane contains no gaps or overlaps when the activators are closed thereon).

FIG. 27B is a tiled plane of two regular polygonal activators 164 and 166.

FIG. 27C is a tiled plane of rhomboidal activators 168.

FIG. 27D is an array of indicator lights 162.

FIG. 27E is a tiled plane of parallelogramic activators 170 which could serve as LED displays.

FIG. 27F is an array of decorative polygonal activators 172.

FIG. 27G is a group of nine small television or computer monitors 174, wherein each monitor 174 has controls 175 on one side that either fit under the top of adjacent unit 174 or retract into parent unit 174 when columns 158 are closed.

FIG. 27H shows an array of three slider controls 176 wherein each slider 176 is mounted as a horizontal column 158 on a lateral assembly 10 that opens vertically, wherein each slider 176 has a spring-activated scale 177 that flips up as lateral assembly 10 is opened; then as lateral assembly 10 is closed a small plunger 178 on the underside of the control 176 immediately above pushes scale 177 back down where it is held a between adjacent controls 176 when lateral assembly 10 is in closed position.

Figure 28:
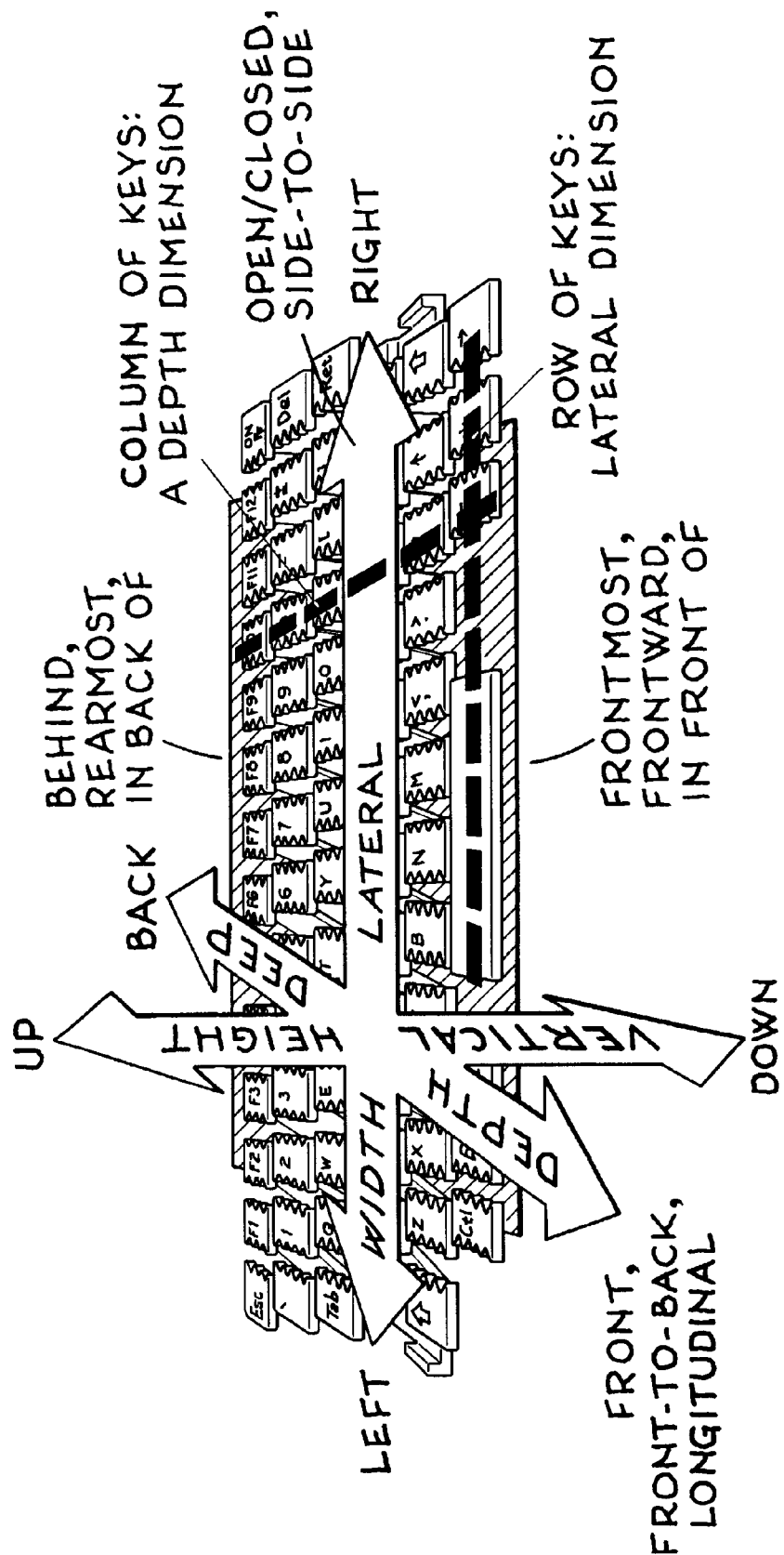

Referring to FIG. 28 of the Drawings: This view describes the orthogonal terminology that is used in this Specification and its Claims in order to eliminate any confusion that may arise thereof. For example, should the keys on a basically horizontal keyboard be said to have horizontal and vertical rows? And what does wide mean? In most rectangles wide means "across narrower dimension", but when it comes to keyboards wide often describes its longer lateral dimension. And how about depth: can this refer only to a vertically downward direction or also to a front-to-back direction? All such orthogonal conflicts are resolved in FIG. 28.

Referring to FIG. 29 of the Drawings: This includes an exploded-assembly view of a typical key-to-busbar assembly of a third embodiment of the Disclosed Invention. FIG. 29A shows five keys 2 mounted on a typical busbar 12; FIG. 29B shows an elastomeric switch strip 180 whose domes 182 are located under keys 2 and whose somewhat zigzag torso 188 fits snugly into a somewhat zigzag trough 192 of busbar 12; FIG. 29C shows a finger 43 of flexible circuitry ribbon 40 whose somewhat zigzag outline 41 also fits into trough 192 of busbar 12; and FIG. 29D shows a typical busbar 12. In particular this view as a whole shows (1) key prongs 118 of keys 2 aligned above busbar cavities 135 which key prongs 118 fit into and then slide up and down when each key 2 is activated, (2) key pendants 122 aligned above cavity 222 in the top of dome cap 183 of elastomeric switch strip 180 which pendants 122 fit into (this fitting helps to keep any key 2 flat if it is not depressed in its very center and generally aids in stabilizing the immediate key-to-dome-to-busbar assembly when key 2 is depressed), (3) elastomeric switch strip 180 and flexible circuitry ribbon 40 aligned above trough 192 in busbar 12 which switch strip 180 and ribbon 40 fit into, and (4) switch strip projections 184 along the sides of elastomeric switch strip 180 aligned above busbar indents 198 along the sides of trough 192 of busbar 12 which projections 184 fit into.

Referring to FIG. 30 of the Drawings: This is a plan section thro' a typical key-to-busbar assembly taken above busbar 12 and below the underside of key 2 when key 2 is in up or unactivated position in a third embodiment of the Disclosed Invention. This view shows (1) the outline of the topmost portion of key 2 that lies above the section cut, (2) the top of busbar 12, in particular its outer edges 13 and the sides of trough 192 located along the central portion of busbar 12, (3) the outer edges of torso 188 of elastomeric switch strip 180 which fit snugly into trough 192 of busbar 12 (thus the lines representing torso 188 and trough 192 coincide), (4) the two key prongs 118 of key 2 that fit into the two cavities 135 of busbar 12 and slide up and down in cavities 135 when key 2 is depressed or activated (thus the lines representing the outer portions of key prongs 118 and cavities 135 coincide), (5) the centrally located pendant 122 of key 2 which fits snugly into cavity 222 in the top of dome cap 183 of dome 182 of elastomeric switch strip 180 (thus the lines representing pendent 122 and dome cap 183 coincide), (6) the top of dome 182 around and below dome cap 183, and (7) four projections 184 that protrude from the sides of elastomeric switch strip 180 and fit snugly into indents 186 located in the sides of trough 192 in busbar 12 (thus the lines representing projections 184 and indents 186 coincide).

Referring to FIG. 31 of the Drawings: This is a vertical section thro' a longitudinal portion of the upper part of key 2, the center of dome 182 of elastomeric switch strip 180 located beneath the upper portion of key 2, the part of trough 192 of busbar 12 that is below key 2, the part of flexible circuitry ribbon 40 that lays below key 2, the intersection of two key prongs 118 with two busbar prongs 116 below the upper part of key 2, and switch strip projection 188 inserted into busbar indent 186 in a third embodiment of the Disclosed Invention. In particular this view shows the operative relation between key 2, switch strip dome 182, electrical conductor 124 on the underside of dome 182, and open circuitry terminals 132 on or in flexible circuitry ribbon 40 when key 2 is activated; in which the positions of key 2 and dome 182 appear in solid lines when key 2 is in up or unactivated position and the positions of key 2 and dome 182 appear in dotted lines when key 2 is in depressed or activated position. Thus when downward pressure is applied to the top of key 2, the elastomeric nature of dome 182 allows dome 182 to depress downward until electrical conductor 124 on its underside comes into contact and completes a circuit with two open circuitry terminals 132 in flexible circuitry ribbon 40; then when downward pressure is removed from the top of key 2 the elastomeric material of dome 182 forces it back upward in a manner that pushes key 2 to its up or unactivated position. This view also shows (1) how busbar prong projections 116P limit the upward movement of key 2 by catching key prong projections 118P when key 2 has reached its up or unactivated position at the same time that dome 182 still exerts a slight upward pressure against the underside of key 2, and this is how the unactivated position of key 2 is perpetually maintained. However, key 2 can also be completely removed from busbar 12 for purposes of servicing if a considerable pressure is applied under the side edges of key 2 in a manner that forces key prong projection 118P to press against busbar prong projection 116 until busbar prong 116 deflects backward enough to allow the outer surfaces of key prong 118 to pass the outer surfaces of busbar prongs 116 until the bottoms of key prongs 118 are above the tops of busbar prongs 116, at which point key 2 is effectively clear of busbar 12. A reversal of these movements is how key 2 is initially installed on busbar 12). Finally this view shows several other microconductors 131 in or on flexible circuitry ribbon 40 in addition to open circuitry terminals 132, in which said other microconductors 131 form open circuits with other keys 2 in this particular busbar 12.

Referring to FIG. 32 of the Drawings: This includes two views of part of the undersides of three adjacent busbars 12 for purposes of showing the operation of the continuous U-spring 200 in this embodiment of the Disclosed Invention, in which FIG. 32-O shows the adjacent busbars 12 in open position and FIG. 32C shows the adjacent busbars 12 in closed position. Both these views show the underside surface 12U of each busbar 12, an indented surface 13 in the underside surface 12U of each busbar 12, and a continuous U-spring 200 situated in each indented surface 13 of each busbar 12 for the full lateral width of keyboard 1. As the thickness of U-spring 200 is slightly less than the depth of indented surface 13, U-spring 200 can move freely in a lateral direction between indented surfaces 13 of busbars 12 and the tops of braces 14 from one side of keyboard 1 to the other. Thus U-spring 200 operates as follows: in FIG. 32-O, U-spring appears in its natural untensioned state, at which time its lower (in this view) two corners are positionally limited by two peninsular portions of the undersides 12U of two adjacent busbars 12 in a manner that determines the maximum open position of keyboard 1. Then when keyboard 1 is closed by an application of a slight compressive force against the right and left sides of keyboard 1, U-spring 200 contracts until it is poised in the compressive state shown in FIG. 32-C, at which point a catch mechanism (not shown) under each side of keyboard 1 engages in a manner that holds keyboard 1 in its closed position. Then when one wants to open keyboard 1, he or she simply lifts the keyboard's right and left sides a little until the catches under each side disengage—then the built-up compression in U-spring 200 makes keyboard 1 suddenly spring open.

Figure 33:
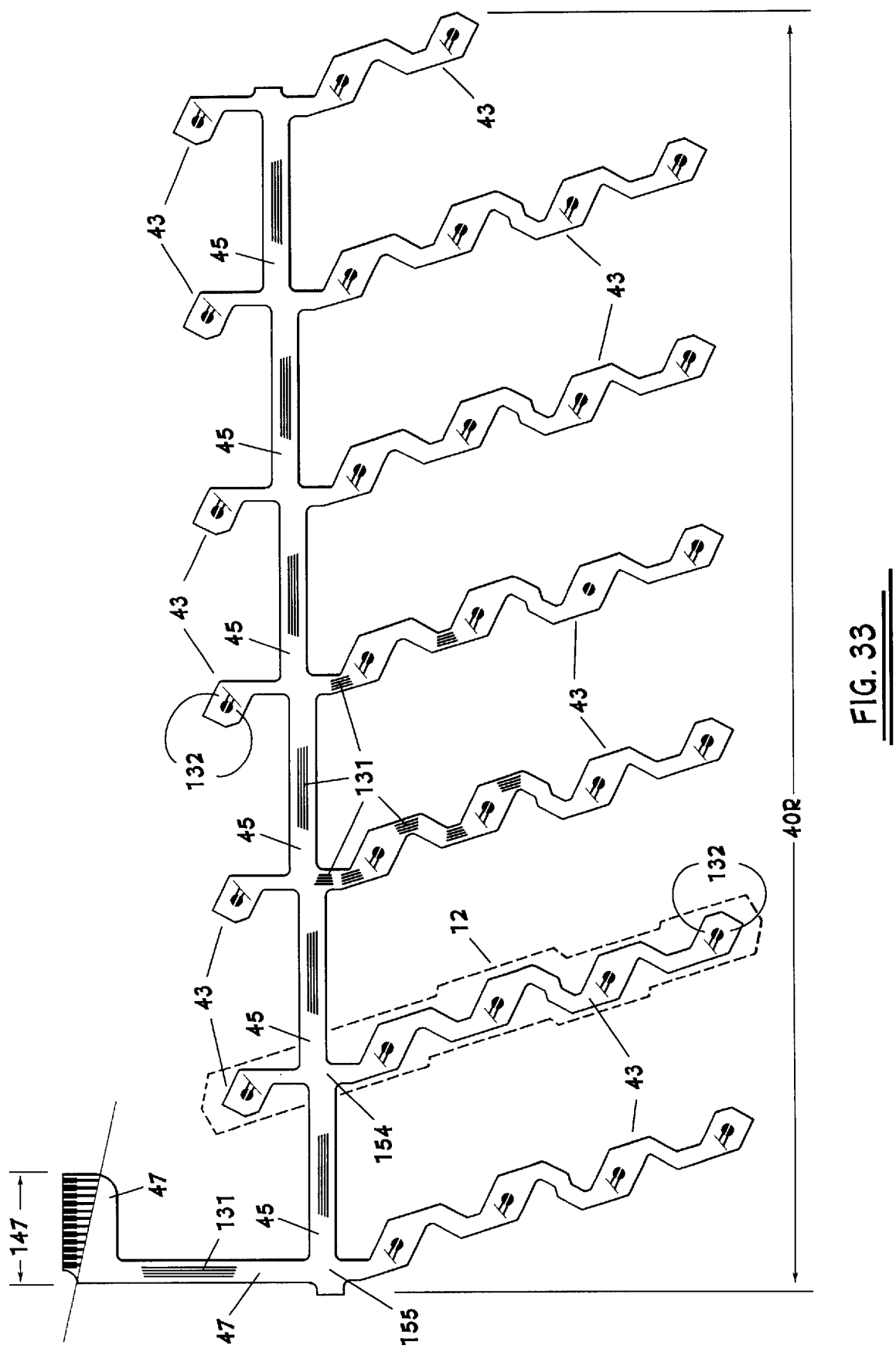

Referring to FIG. 33 of the Drawings: This is a plan view of right half 40R of flexible circuitry ribbon 40 that conducts electronic data from each key 2 in keyboard 1 to parent computer circuitry 39 in the third embodiment of the Disclosed Invention. In this view, flexible circuitry ribbon 40 has (1) a plurality of somewhat zigzag-shaped fingers 43, each of which fits into a trough 192 of busbar 12 (the outline of one of which is shown in dotted lines) and conducts electronic data via a plurality of microconductors 131 from the keys mounted on each busbar 12 to a collector locus 154 on each busbar 12, (2) a plurality of bridge segments 45 that conduct electronic data via a plurality of microconductors 131 from the collector locus 154 on each busbar 12 to a second collector locus 154 on each adjacent busbar 12 in a continuous manner from the outermost to the innermost busbars toward a central collector locus 155 near the central rear of keyboard 1, and (3) a tab 47 that conducts electronic data via a plurality of microconductors 131 from central collector locus 155 to a connecting interface 147 that plugs into parent computer circuitry 39. The left half 40L of flexible circuitry ribbon 40 is essentially a mirror image of right half 40R.

Although certain embodiments of the Disclosed Invention have now been described with certain a degree of particularity, each portion of its assembly and operation in whole or in part can be said to have numerous other embodiments, variations, or modifications thereof, each of which in and of itself and in any combination thereof do not depart from the scope and spirit of the Invention as disclosed herein: that what an embodiment is is not necessarily what it does. Thus it should be understood that the foregoing description of any particular embodiments of the Disclosed Invention has been made only by way of example, and that numerous variations or modifications thereof may be resorted to without departing from the scope and spirit of the Invention as hereinafter claimed.

What is claimed is:

1. A laterally flexible input/output device which conducts electronic data between said device and a parent electronic system, comprising, in combination:
   (a) a plurality of input/output activators arranged in a generally planar pattern;
   (b) a plurality of essentially planar and parallel upper bars and a plurality of essentially planar and parallel lower bars located beneath said upper bars that includes means for interconnecting said upper and lower bars to form a laterally flexible assembly that can be pulled apart to an open position and pushed together to a closed position;
   (c) means for mounting said planar pattern of activators on said planar upper bars whereby said activators mounted thereon can be pulled apart to an open position and pushed together to a closed position;
   (d) means for mounting said laterally flexible assembly on an underlying base, wherein said base is selected from the group consisting of a surface of said parent computer or other electronic system, a surface that is a part of but nonintegral with said parent system, and a surface that is not a part of said parent system; and
   (e) means for conducting electronic data between said activators and said parent system whether said activators are in open or closed position;

whereby said input/output device is used to conduct electronic data between said activators mounted thereon and said parent system whether said activators are in open or closed position;

whereby when said activators are in either open or closed position one can easily conduct electronic data between said activators and said parent system while at the same time said parent electronic system can be nearly as small as the planar area of said laterally flexible assembly when said assembly is in closed position.

2. The input/output device according to claim 1, wherein said means for conducting electronic data between each of said activators mounted thereon and said parent system comprises a flexible ribbon of microconductors, wherein
   (a) a portion of said flexible ribbon of microconductors extends under each of said activators for purposes of completing a circuit between each activator located thereabove and said parent system when said activators are activated whether in open or closed position;
   (b) a portion of said flexible ribbon of microconductors extends between each adjacent pair of said upper bars on which said activators are mounted whether said activators are in open or closed position; and
   (c) a portion of said flexible ribbon of microconductors extends from an upper bar of said laterally flexible assembly to said parent system whether said laterally flexible assembly is in open or closed position;

whereby said flexible ribbon of microconductors conduct electronic data between each of said activators and said parent system whether said activators are in open or closed position.

3. The input/output device according to claim 2, wherein said said flexible ribbon of microconductors that conducts electronic data between said activators and said parent system comprises two distinct halves, wherein each half includes portions that extend under a portion of said activators, portions that extend between a portion of said upper bars of said laterally flexible assembly, and a portion that extends from one of said upper bars to said parent system.

4. The input/output device according to claim 1, wherein said means for conducting electronic data between each of said activators mounted thereon and said parent system further includes an elastic means between each activator and the portion of said flexible ribbon of microconductors extending under said activator, wherein
   (a) a portion of said elastic means supports each activator located thereabove when said activator is in unactivated position;
   (b) the portion of said elastic means that supports said activator in said unactivated position contracts in a direction toward the portion of said flexible ribbon of microconductors that extends under said activator when said activator is activated until a conductive means that is a part of said portion of elastic means completes a circuit in said flexible ribbon of microconductors; and
   (c) the portion of said elastic means that contracts in a direction toward said flexible ribbon of microconductors when said activator located thereabove is activated expands in a direction away from said microconductors when said activator is deactivated until said activator returns to said unactivated position;

whereby said elastic means maintains each activator in its unactivated position when said activator is deactivated and also completes a circuit that conducts electronic data between said activator and said parent system when said activator is activated.

5. The input/output device according to claim 4, wherein said elastic means that is located between each activator and the portion of said flexible ribbon of microconductors extending under said activator includes means of securing said elastic means to said upper bar on which said activators are mounted; wherein said elastic means contains a plurality of projections that fit into a corresponding plurality of indentations in said upper bar.

6. The input/output device according to claim 1, wherein each of said upper bars includes a trough-like depression in said upper bar; wherein
 (a) said trough-like depression is located along the approximate longitudinal center of said upper bar;
 (a) said trough-like depression has a somewhat zigzag outline along the approximate longitudinal central top surface area of said upper bar;
 (a) said trough-like depression extends from nearly one end to nearly the other end of said upper bar, and
 (b) said trough-like depression has an essentially flat bottom and sides that are essentially vertical to said bottom;
 whereby said trough-like depression that is located along said approximate longitudinal center of said upper bar, that has said zigzag outline along the approximate longitudinal central top surface area of said upper bar, that extends from said nearly one end to nearly the other end of said upper bar, and that has said essentially flat bottom and sides that are essentially vertical to said bottom in said upper bar facilitates the assembly and operation of said activators, said flexible circuitry ribbon, and said elastic means that are located in said upper bar.

7. The input/output device according to claim 1, wherein the outer portions of said laterally flexible assembly that extend beyond said base on which said assembly is mounted when said assembly is in open position are provided adequate support by thickening a plurality of the outermost lower bars on each side of said assembly in a direction generally perpendicular to the direction of extension of said laterally flexible assembly.

8. The input/output device according to claim 1, further including a continuous spring located below said activators and extending from substantially one side of said input/output device to the other, wherein
 (a) certain portions of said continuous spring rest against certain portions of said laterally flexible assembly of said input/output device in a manner that limits the maximum width of said input/output device when said device is in open position; and
 (b) said continuous spring has a configuration that enables it to compress when said laterally flexible assembly of said input/output device moves from open to closed position, so that when said input/output device is in closed position said spring is poised in a compressive state that makes said input/output device spring outward when one begins to open said device;
 whereby said continuous spring limits the maximum width of said input/output device when it is in open position and makes said device spring automatically toward its open position when it begins to open from its closed position.

9. A method for conducting electronic data between a laterally flexible input/output device and a parent electronic system, comprising, in combination:
 (a) arranging a plurality of input/output activators in a generally planar pattern;
 (b) arranging a plurality of essentially planar and parallel upper bars and a plurality of essentially planar and parallel lower bars located beneath said upper bars that includes means of interconnecting said upper and lower bars to form a laterally flexible assembly that can be pulled apart to an open position and pushed together to a closed position;
 (c) mounting said planar pattern of activators on said planar upper bars so that said activators mounted thereon can be pulled apart to an open position and pushed together to a closed position;
 (d) mounting said laterally flexible assembly on an underlying base, wherein said base is selected from the group consisting of a surface of said parent computer or other electronic system, a surface that is a part of but non-integral with said parent system, and a surface that is not a part of said parent system; and
 (e) conducting electronic data between said activators and said parent system whether said activators are in open or closed position;
 whereby said input/output device is used to conduct electronic data between said activators mounted thereon and said parent system whether said activators are in open or closed position;
 whereby when said activators are in either open or closed position one can easily conduct electronic data between said activators and said parent system while at the same time said parent electronic system can be nearly as small as the planar area of said laterally flexible assembly when said assembly is in closed position.

10. A method according to claim 9 further including the steps of conducting electronic data between each of said activators mounted thereon and said parent system via a flexible ribbon of microconductors, as follows:
 (a) extending a portion of said flexible ribbon of microconductors under each of said activators for purposes of completing a circuit between each activator located thereabove and said parent system when said activators are activated whether in open or closed position;
 (b) extending a portion of said flexible ribbon of microconductors between each adjacent pair of said upper bars on which said activators are mounted whether said activators are in open or closed position; and
 (c) extending a portion of said flexible ribbon of microconductors from an upper bar of said laterally flexible assembly to said parent system whether said laterally flexible assembly is in open or closed position;
 whereby said flexible ribbon of microconductors conduct electronic data between each of said activators and said parent system whether said activators are in open or closed position.

11. A method according to claim 10 further including the steps of dividing said flexible ribbon of microconductors that conducts electronic data between said activators and said parent system into two distinct halves, wherein each half includes portions that extend under a portion of said activators, portions that extend between a portion of said upper bars of said laterally flexible assembly, and a portion that extends from one of said upper bars to said parent system.

12. The input/output device according to claim 9 further including the steps of locating an elastic means between each activator and the portion of said flexible ribbon of microconductors extending under said activator, as follows:

(a) locating said elastic means so that a portion thereof supports each activator located thereabove when said activator is in unactivated position;

(b) locating said elastic means so that the portion that supports said activator in said unactivated position contracts in a direction toward the portion of said flexible ribbon of microconductors that extends under said activator when said activator is activated until a conductive means that is a part of said portion of elastic means completes a circuit in said flexible ribbon of microconductors; and (c) locating said elastic means so that the portion that contracts in a direction toward said flexible ribbon of microconductors when said activator located thereabove is activated expands in a direction away from said microconductors when said activator is deactivated until said activator returns to said unactivated position;

whereby said elastic means maintains each activator in its unactivated position when said activator is deactivated and also completes a circuit that conducts electronic data between said activator and said parent system when said activator is activated.

13. The input/output device according to claim 12 further including the steps of providing each of said elastic means located between each activator and the portion of said flexible ribbon of microconductors extending under said activator with a method of securing said elastic means to said upper bar on which said activators are mounted, as follows:

providing said elastic means with a plurality of projections that fit into a corresponding plurality of indentations in said upper bar.

14. The input/output device according to claim 9 further including the steps of locating a trough-like depression in said upper bar, as follows:

(a) locating said trough-like depression along the approximate longitudinal center of said upper bar;

(a) providing said trough-like depression with a somewhat zigzag outline along the approximate longitudinal central top surface area of said upper bar;

(a) extending said trough-like depression from nearly one end to nearly the other end of said upper bar, and (b) providing said trough-like depression with an essentially flat bottom and sides that are essentially vertical to said bottom;

whereby said trough-like depression that is located along said approximate longitudinal center of said upper bar, that has said zigzag outline along the approximate longitudinal central top surface area of said upper bar, that extends from said nearly one end to nearly the other end of said upper bar, and that has said essentially flat bottom and sides that are essentially vertical to said bottom in said upper bar facilitates the assembly and operation of said activators, said flexible circuitry ribbon, and said elastic means that are located in said upper bar.

15. The input/output device according to claim 9 further including the steps of adequately supporting the outer portions of said laterally flexible assembly that extend beyond said base on which said assembly is mounted when said assembly is in open position by thickening a plurality of the outermost lower bars on each side of said assembly in a direction generally perpendicular to the direction of extension of said laterally flexible assembly.

16. The input/output device according to claim 9 further including the steps of locating a continuous spring below said activators and extending said continuous spring from substantially one side of said input/output device to the other, as follows:

(a) arranging certain portions of said continuous spring to rest against certain portions of said laterally flexible assembly of said input/output device in a manner that limits the maximum width of said input/output device when said device is in open position; and (b) configuring said continuous spring so that it compresses when said laterally flexible assembly of said input/output device moves from open to closed position, then when said input/output device is in closed position said spring is poised in a compressive state that makes said input/output device spring outward when one begins to open said device;

whereby said continuous spring limits the maximum width of said input/output device when it is in open position and makes said device spring automatically toward its open position when it begins to open from its closed position.

* * * * *